US010585871B2

(12) United States Patent
Scherrer

(10) Patent No.: US 10,585,871 B2
(45) Date of Patent: Mar. 10, 2020

(54) DATABASE ENGINE FOR MOBILE DEVICES

(71) Applicant: INVISO CORP., Bellvue, WA (US)

(72) Inventor: Jeff Scherrer, Seattle, WA (US)

(73) Assignee: INVISO CORPORATION, Bellevue, WA (US)

( * ) Notice: Subject to any disclaimer, the term of this patent is extended or adjusted under 35 U.S.C. 154(b) by 678 days.

(21) Appl. No.: 15/396,312

(22) Filed: Dec. 30, 2016

(65) Prior Publication Data

US 2017/0255662 A1    Sep. 7, 2017

Related U.S. Application Data

(60) Provisional application No. 62/304,068, filed on Mar. 4, 2016.

(51) Int. Cl.
*G06F 16/13* (2019.01)
*G06F 16/20* (2019.01)
(Continued)

(52) U.S. Cl.
CPC ........ *G06F 16/2282* (2019.01); *G06F 16/196* (2019.01); *G06F 16/221* (2019.01); *G06F 16/24569* (2019.01)

(58) Field of Classification Search
CPC ......... G06F 17/30339; G06F 17/30315; G06F 17/30477
(Continued)

(56) References Cited

U.S. PATENT DOCUMENTS 7,966,343 B2 *  6/2011  Yang ..................... G06F 16/221
                                                                  707/791
8,700,674 B2 *  4/2014  Bear ....................... G06F 16/22
                                                                  707/802
(Continued)

OTHER PUBLICATIONS

Daniel Abadi, "A tour through hybrid column/row-oriented DBMS schemes", Sep. 3, 2009, <http://dbmsmusings.blogspot.com/2009/09/tour-through-hybrid-columnrow-oriented.html> (Year: 2009).*
(Continued)

*Primary Examiner* — Hosain T Alam
*Assistant Examiner* — Robert F May
(74) *Attorney, Agent, or Firm* — Scott Evan Gilbert

(57) ABSTRACT

A novel database query and writing engine for rapidly storing, retrieving and modifying large amounts of data on mobile devices is disclosed. The innovative database engine software comprises the creation of a set of files for each table in a database, wherein CRUD (create-retrieve-update-delete) operations are streamlined for mobile or other devices by organizing memory for efficient read and write operations. The set of associated files segregate fixed length and variable length data types for faster seek, read and write operations, and keep track of changes to values and database table schema changes in terms of deletions and insertions of rows and columns. The innovative database engine manages complexities associated with storage and retrieval of large amounts of data, which comprise CRUD operations. In addition, the database engine introduces a dual buffer system to more rapidly process blocks of database memory.

22 Claims, 17 Drawing Sheets

(51) Int. Cl.
*G06F 16/21* (2019.01)
*G06F 16/22* (2019.01)
*G06F 16/188* (2019.01)
*G06F 16/245* (2019.01)

(58) Field of Classification Search
USPC .......................................................... 707/769
See application file for complete search history.

(56) References Cited

U.S. PATENT DOCUMENTS

| | | | |
|---|---|---|---|
| 9,619,502 B2* | 4/2017 | Klauke | ............... G06F 16/2282 |
| 10,402,451 B2* | 9/2019 | Ben-Natan | ............. G06F 16/80 |
| 2010/0042587 A1* | 2/2010 | Johnson | ............ G06F 16/24569 |
| | | | 715/243 |
| 2016/0078089 A1* | 3/2016 | Hu | .................... G06F 16/24544 |
| | | | 707/714 |

OTHER PUBLICATIONS

Schaffner, Jan & Bog, Anja & Krueger, Jens & Zeier, Prof. Dr. Alexander. (2008). A Hybrid Row-Column OLTP Database Architecture for Operational Reporting. 27. 10.1007/978-3-642-03422-0_5. (Year: 2008).*

David G. Sullivan, "Schema Representation: the Logical-to-Physical Mapping", 2010, <http://people.fas.harvard.edu/~cs165/notes/schema_notes.pdf> (Year: 2010).*

Kailash Joshi, "Chapter 6: Database Management", Jun. 28, 2008, <http://www.umsl.edu/~joshik/msis480/chapt06.htm> (Year: 2008).*

Adrienne Watt, "Chapter 5 Data Modelling", Dec. 21, 2014, <https://opentextbc.ca/dbdesign01/chapter/chapter-5-data-modelling> (Year: 2014).*

Loren Rhodes, "Three Level Database Architecture", Nov. 9, 2011, <http://jcsites.juniata.edu/faculty/rhodes/dbms/dbarch.htm> (Year: 2011).*

Bach M., Werner A., "Hybrid Column/Row-Oriented DBMS", Man—Machine Interactions 4: 4th International Conference on Man—Machine Interactions, ICMMI 2015 Kocierz Pass, Poland, Oct. 6-9, 2015(pp. 697-707) (Year: 2015).*

* cited by examiner

```
IEnumerable<OperationResult> Execution(DbAdapter adapter)
{
    List<OperationResult> results = new List<OperationResult>();
        ┌──────────────────────────────────────────────────────┐
        │ GenerateOperationLocals, GenerateOperationInitializer │
        └──────────────────────────────────────────────────────┘
        ┌─ ── ── ── ── ── ── ── ── ── ── ── ──┐
          Boolean? queryResult_0 = null;              ⎫
          Exception operationException_0 = null;      ⎬── 1301
        └─ ── ── ── ── ── ── ── ── ── ── ── ──┘      ⎭ using (DbRowEnumerator rowEnumerator = new DbRowEnumerator(adapter, "People"))
    {
            ┌───────────────────────────────────────────┐
            │ GeneratePassLocals, GeneratePassInitializer │
            └───────────────────────────────────────────┘
            ┌─ ── ── ── ── ── ── ── ── ── ── ── ─┐
              Boolean operation_0_complete = false;       ⎫
              rowEnumerator.EnableDoubleBuffering = true; ⎬── 1302
            └─ ── ── ── ── ── ── ── ── ── ── ── ─┘       ⎭

┌─ ── ── ── ── ── ── ── ── ── ── ── ── ── ── ──┐
          while (rowEnumerator.MoveNext() || !operation_0_complete)
          {
              if (operation_0_complete)                                ⎬── 1303
                  break;
              if (rowEnumerator.CurrentExists)
        └─ ── ── ── ── ── ── ── ── ── ── ── ── ── ── ──┘
              {
                    ┌───────────────────────────────┐
                    │ GenerateExistencePassExpression │
                    └───────────────────────────────┘
                    ┌─ ── ── ── ── ── ── ── ─┐
                      if (!queryResult_0.HasValue)    ⎫
                          queryResult_0 = true;       ⎬── 1304
                    └─ ── ── ── ── ── ── ── ─┘       ⎭
              }
              else
              {
                    ┌──────────────────────────────────┐
                    │ GenerateNonExistencePassExpression │
                    └──────────────────────────────────┘
                    ┌─ ── ── ── ── ── ── ── ── ─┐
                      queryResult_0 = false;             ⎫
                      operation_0_complete = true;       ⎬── 1305
                    └─ ── ── ── ── ── ── ── ── ─┘       ⎭
              }
          }
            ┌──────────────────────┐
            │ GeneratePassFinalizer │
            └──────────────────────┘
    }
    ┌──────────────────────────┐
    │ GenerateOperationFinalizer │                                          ── 1306
    └──────────────────────────┘
    ┌─ ── ── ── ── ── ── ── ── ── ── ── ── ── ── ── ── ── ── ──┐
      if (operationException_0 == null)
          results.Add(new ScalarResult<Boolean>(dbOperation, queryResult_0.HasValue && queryResult_0.Value));
      else
          results.Add(new ScalarResult<Boolean>(dbOperation, operationException_0));
    └─ ── ── ── ── ── ── ── ── ── ── ── ── ── ── ── ── ── ── ──┘ return results;
}
```

Fig. 13

DATABASE ENGINE FOR MOBILE DEVICES

CROSS REFERENCE TO PRIORITY APPLICATIONS

This non-provisional utility application claims the benefit of U.S. Provisional Application No. 62/304,068, filed on 4 Mar. 2016.

FIELD OF THE INNOVATION

This innovation relates to database management software methods, particularly those carried out on mobile devices.

BACKGROUND

Data storage and retrieval on mobile devices generally translates traditional database management techniques that have evolved for mainframe-style servers and fixed LANs to the mobile device DBMS applications. For manipulation of large amounts of data, or for retrieval of data from very large databases, database operations performed by a mobile device CPU may consume a large amount of the device's memory and CPU resources, greatly slowing the DBMS operations due to restrictions of memory size and CPU power compared to larger fixed-location desktops and mainframe servers.

SUMMARY

The present innovation sets forth a novel database query and writing (dbQW) engine, wherein database query and writing execution is greatly streamlined. In contrast to conventional database query languages, such as SQL, where a database is stored in a single file on a mass storage drive, the innovative software method comprises creating a multi-file format to represent a database, where the multiple files representing a single database may be stored in a folder on a storage device. This innovation is particularly adapted for managing complexities associated with storage and retrieval of large amounts of data on mobile devices, which comprise CRUD (Create-Retrieve-Update-Delete) database operations. The innovation is also particularly adapted for electronic solid state drives, taking advantage of the more rapid disk read and write operations compared to speeds available with hard drives built around the older magnetic read head technology.

It is an object of the instant innovation to create a set of files for a particular database, and more specifically, for each table in the database if there are more than one in a relational database. The files associated with a table may be a Column Definition file (Columns file), a Row Existence file, a Fixed-Length Values file, and a Variable-Length Values file. By way of example, a relational database may typically comprise one or more tables, wherein data are organized into rows and columns in each table. Each table in the relational database may contain a mixture of both fixed length and variable length values. By the creation of the set of files to carry out operations on a database, the innovative dbQW engine may perform CRUD operations in bulk very rapidly. The set of files that are created for a database table permit an efficiency of processor resources as the number of seek operations (calls?) are greatly curtailed for a CRUD operation in comparison to convention methods. This is an advantage for databases stored on conventional hard disk drives (HDDs), and enhances the speed and efficiencies of the more rapid access solid state drives (SSDs). In addition, values and derived data from the database are distributed among the individual files of the innovative file set, permitting the engine to rapidly seek and locate specific data required to complete operations by searching individual files dedicated to containing only certain data types.

The database table or tables may contain both fixed and variable-length elements. In the Fixed Length Values file, the two-dimensional database schema is maintained. The Fixed Length Values file maintains the schema of the original database. In the case of a table that contains variable length values, a Variable-Length Values file is created into which all of the variable-length values from the table may be copied. The Variable-Length Values file may be co-created with the Fixed-Length Values file, if the database contains variable-length values. Variable-length values may be copied into the Variable-Length Values file in the order they appear in the database table, for instance, by scanning the table from left to right, top to bottom and copying the value into the Variable-length Values file as they are encountered. Other orders may be considered if desired.

According to the instant innovation, variable-length values may be represented in the Fixed-Length Values file by inserting fixed-length pointers at an index in the two-dimensional Fixed-Length Values file that are the same as the column and row indices of the variable-length values in the database. Each pointer contains the address or offset of the associated value in the one-dimensional Variable-Length Values file, and all pointers occupy a fixed number of bytes. Being a fixed-length value, the pointers are compatible with the fixed length data existing in the Fixed-Length Values file. In this way, the Fixed-Length Values file may represent the entire database. The pointers may contain both the size of the variable length value in terms of the number of bytes of memory it occupies, as well as its position in the Variable Length Value file to which it points, so that the variable-length value may be accessed and manipulated from within the Variable-Length Values file. As a result, the row length for every row of the Fixed-Length Values file may be the same. Fixed rows length in a file is advantageous for read/write and seek operations, where the speed of such operations is increased over variable-length rows. Examples of fixed length values may be short and long integers, floating point numerical data, as well as string data, and arrays thereof, where the number of bytes representing each number or string is uniform for all data of the same type.

When rows in the database are to be deleted, the innovative method provides Row Existence file to keep track of existing rows and deleted rows in the database. The Row Existence file contains a series of bytes, where each bit is a flag. According to the innovative method, instead of operationally deleting a row where multiple operations involving many cycles of byte rearrangements, a row deletion operation according to the innovative method may comprise simply setting or clearing the flag bits in the Row Existence file. By way of example, flag bits are set to logic 1 from logic 0, indicating that a row is deleted. For existing rows, or if a row is added, bits may hold a value of 0, or cleared if previously set at logic 1. It is equally valid to reverse the binary coding for the Row Existence file, in that a set flag bit may indicate a row the exists, and a flag bit cleared to logic 0 if a row is deleted. The operation row deletion is much more rapid than conventional row deletion, where the table is reorganized by re-indexing all rows following the deleted row. The Row Existence file tracks the existence of deleted rows within the Fixed Length Values file. According to the present innovation, the Row Existence file serves to store bytes containing bits corresponding to deleted rows. By way of example, bits that have a value of logical one are flags indicating deleted rows in the Fixed Length Value file tables, and are stored in the bytes occupying the Row Existence file. Bits that have a value of logical zero correspond to existing (undeleted) rows. Thus, one byte having a value of 255 (0xFF hex) contains eight bits, each having a value of one. This would correspond to eight consecutive rows that are deleted. A byte having a value of zero (0x00 hex) correspond to eight consecutive rows that have not been deleted. The size of the Row Existence file is approximately equal to the number of rows in all tables contained in the Fixed Length Values file divided by 8.

According to the instant innovation, the number of null columns may also be contained in the row headers as metadata in the Fixed Length Value file. Nullable columns of the table are tracked in each row of the table stored in the Fixed Length Values file, and each one is assigned a single bit that is stored in bytes of the row header. Thus each byte can store up to 8 bits identifying nullable column values in that row. Bits are written in the order that the nullable columns appear in the table, starting from the first column. By way of example, a bit may have a value of zero to indicate that the column has no value (i.e. it is null). A bit may have a value of one to indicate that the mapped column has a value. The sequence of bits may be based on the order of nullable-only columns, in the order they are defined for the respective table.

The Variable Length Value file contains variable-length data (in terms of bytes) that do not have a pre-determined number of bytes in storage. These types of data are typically variable-length string values containing name and address records, for example, but may also be, for example, a C-type structure that can contain any a group of related variables of any type, such as contact information for customers. This file may be accompanied by an auxiliary file called a Fragments file, wherein gaps or fragments are present in the Variable Length Value file when a value is either deleted or substituted by a value that occupies fewer bytes. According to the instant innovation, deletion of a variable length value in the Variable Length Values file, it is to be understood that the physical file segment that was allocated to that value remains, and is not destroyed. This space is now available to store a new value of size equal to or smaller than the fragment. If a new value is substituted for the old value contained within that segment, an unoccupied fragment remains that may be inventoried in the Fragments file for future processes to query when they are searching for space to insert a variable length value. Thus the position of the fragment is retained, and is tracked by a pointer stored in the Fragments file. In this way, future operations may replace the empty fragment with a new value. The Fragments file therefore provides a means for processes to readily find deleted spaces in the Variable Length Value file by looking up these positions in the Fragments file, and then insert new values in those empty positions.

By separating the data contained in a database into fixed length and variable length types, the innovation increases the efficiency of read/seek/write operations on the database. According to the innovation, the content created in the database-associated files described above are read into a memory buffer from the disk. Thus, segments of each file are read into a buffer and scanned sequentially, and this operation of reading sequential file segments into a buffer is repeated until the entire file is scanned. This method allows the file to be read most rapidly, that is, in sequential order of bytes as opposed to random disk I/O. The innovation provides for scanning all three of the above files simultaneously.

Because of the differences between the file sizes, various segments of the files on disk are accessed at different rates to read the data contained in these segments into memory buffers. Thus, the innovative method is optimized for solid state drives as data are accessed electronically, and no delay is encountered that is normally associated with mechanical seek operations on conventional hard disk drives (HDDs).

It is an object of the innovation to provide for at least two buffers for processing data from each file to increase operational speed. A first segment of data from one file is read into a first buffer and the data are then conditionally deserialized from bytes to their respective runtime objects/properties. While the deserialization is taking place and subsequent data operations are taking place, a second segment of data is read into a second buffer. The data are then swapped between buffers when the data in the second buffer are fully processed. The processed data are read back to the file on disk from the first buffer, and new data are then read into the first buffer. While the I/O is taking place between the disk and first buffer, data in the second buffer are simultaneously processed. The read/write operations continue until the end of the file is reached. Other associated files may be present, such as a file to store metadata on the columns present in the table. Metadata may contain parameters such as the name of the column, the column type, as well as the IS NULLABLE and IS UNIQUE typing, and the column index.

In contrast, the Variable Length Values file, as the name implies, stores information on columns within a table or multiple tables wherein variable-length data are stored. These variable-length data may be numeric in nature, but may also contain a mixture of numerical data comprising integer types and floating point types, and variable length strings.

Another aspect of the instant innovation is a method of scanning the database tables. Table scan operations are the default operation type into which all data access operations are cast. According to the innovation, the innovative dbQW execution engine architecture is organized into a plurality of layers, comprising an I/O layer, a contextual layer, and a formatting layer. The contextual layer is the layer that handles interactions with the database using POCOs (plain-old-C #-objects). It exposes the functions that are callable by a user against a database. It could be compared to a masking layer, where it may make the dynamic interactions within the formatting layer type more statically for the application the database is being used in. The I/O layer handles reading and writing value types, on a row-by-row basis, to and from streams that represent the data being stored. It provides a set of functions that handle the translation between common primitive types and binary data.

The formatting layer allows a user (i.e., a developer) to build an abstract syntax tree to represent the operation, allowing developers to perform highly complex queries and transactions. The formatting layer analyzes the syntax trees and then generates a set of operations that are executed against the database. Each operation is optimized for the type of syntax tree it represents. The formatting layer of the instant dbQW innovation comprises features that relate to the analysis of the table being operated against, and generates optimized methods for performing such operations based on the structure of the syntax tree. In addition, the formatting layer manages mapping column names and types to the table's column indexes and native types. As an example, the formatting layer handles retrieving information about the schema of the database table. It allows users of the dbQW engine to execute operations against the database dynamically, meaning there are no bindings between C # objects (assuming the dbQW engine has been written in C #) and the schema of the tables. It supplies the dynamic interaction with the database to the execution engine where information about the tables can be bound with C # objects by the contextual layer.

The dbQW execution engine comprises all of the above-mentioned layers. The execution engine handles taking calls against the contextual layer, and mapping the calls to scan operations against the formatting layer. It also handles executing the scan operations created, and mapping the results back to the contextual layer as output to the user/application. The I/O layer handles reading and writing value types, on a row-by-row basis, to and from streams that represent the data being stored. It provides a set of functions that handle the translation between common primitive types and binary data.

The establishment of sets of files for each table in the database allows for minimal interference from other tables that may be present in the database and the size of those tables. According to the instant innovation, scanning a table comprises scanning or reading the associated files, sequentially, from the beginning of the file to the end. According to the instant innovation, table scanning is accomplished by sequentially reading the files by copying portions of the file from disk into two memory buffers, then conditionally deserializing from bytes to native types and values. Conventionally, a single buffer may be used to store data read from disk and undergo processing operations. In this case, a single processor cannot carry out both read operations and deserialization of the data simultaneously. The sequential nature of executing the separate operations slows down the overall processing of the data. To overcome this deficiency and speed up the processing, the instant innovation invokes a double-buffering technique, wherein the instant method creates a first memory buffer and a second memory buffer, whereby data from disk is read and processed in parallel. The first buffer may be the working buffer, where data are operated upon, whereas the second buffer may serve a temporary storage buffer, where data are first copied from disk files or copied to disk files, where data are swapped between the two buffers.

Initially, data may be read sequentially as blocks from the files on disk to fill the first buffer in order that the bytes are read. Once read into the first buffer, data is then read into the second buffer. During the second read operation, data in the first buffer undergoes processing, for instance, a conditional deserialization process and execution of the syntax tree. While data in the first buffer are being processed, serialized data are simultaneously being read into the second buffer. When processing of the first buffer is complete, data are then swapped between the two buffers. The newly read data, now in the first buffer, undergo processing operations, such as deserialization. The newly processed data may now returned to the second buffer, and serialized, to be read back to the file of origin. As an example, if an operation is performed on a table stored in the Fixed-length Values file to modify a table entry at a specific column/row location, or to delete a row or column, the operations are performed on the data in the first, or working, buffer. Processed data in the first buffer may then be serialized before swapping to the second buffer to perform the operations. Once the swap occurs, the former first buffer, may be written to the Fixed-length Values file, which requires seeking back to the location where the former first buffer was read. This write operation to the file may be followed by a seek operation to the location in the file immediately after the former second buffer. The former first buffer is now considered the second buffer and is ready to have data filled into it from the file and repeat the process. This sequence is repeated until the end of the file is reached, or the processing of the table (represented in the file) is complete.

According to the instant innovation, multi-core parallel processing may be invoked to process the data in the working buffer. This technique is particularly advantageous for executing complex operations in a rapid manner, and may greatly enhance performance of the operations. According to the innovation, logic may be included in the I/O layer to adjust the buffer size with the number of cores available in the CPU.

Upon completion of the processing against the buffer, each core waits on its thread for the new data to be written into the working buffer, then resume operations on this block of data. The innovation combines the use of the double buffering described above with parallel processing for an enhanced performance speed, above and beyond parallel processing employed in current commercial software products.

It is another object of the instant innovation to provide for allowing users to create their own optimized table scan operations. This is highly advantageous when unique or tailored operations are needed to be performed against a table or set of tables and need a highly optimized solution. The instant innovation furthermore streamlines user queries by combination of multiple operations into a single execution, minimizing the number of scans against a given file. To realize this, the instant innovation provides a formatting layer that is responsible for analyzing an abstract syntax tree and generating a set of operations to be executed. Each operation is optimized in a unique fashion corresponding to the type of syntax tree that it represents.

The syntax trees that are generated by the instant innovation contain all the table scan operations. To generate syntax trees, the instant innovative method comprises an interface that represents table scan operations and defines a set of methods to generate different expressions, which are combined into a single overarching syntax tree. The methods translate user supplied syntax trees into the proper syntax tree for execution. The instant innovation also allows sharing of a single scan of a file if multiple operations are to be performed against the file. Each operation may be performed in sequence, in the order that the operations are defined in the syntax tree. In addition, a single operation may define many scan executions against one or more tables.

Once an executable syntax tree is generated, it may not be optimized further, since it has already been constructed from an optimized analysis of the operations and user supplied syntax trees. The syntax tree is then compiled at the point of execution of the set of operations. In .NET-based runtimes, syntax trees and dynamic compilation are available through expression trees. In native platforms, LLVM is capable of providing dynamic compilation; custom syntax trees would need to exist to construct operations. The compiled syntax trees in the instant innovation yield methods that are very close to native code, allowing them to run very fast.

BRIEF DESCRIPTION OF THE DRAWINGS

FIG. 13. Example of generated function code for an optimized query.

DETAILED DESCRIPTION

Figure 1A:
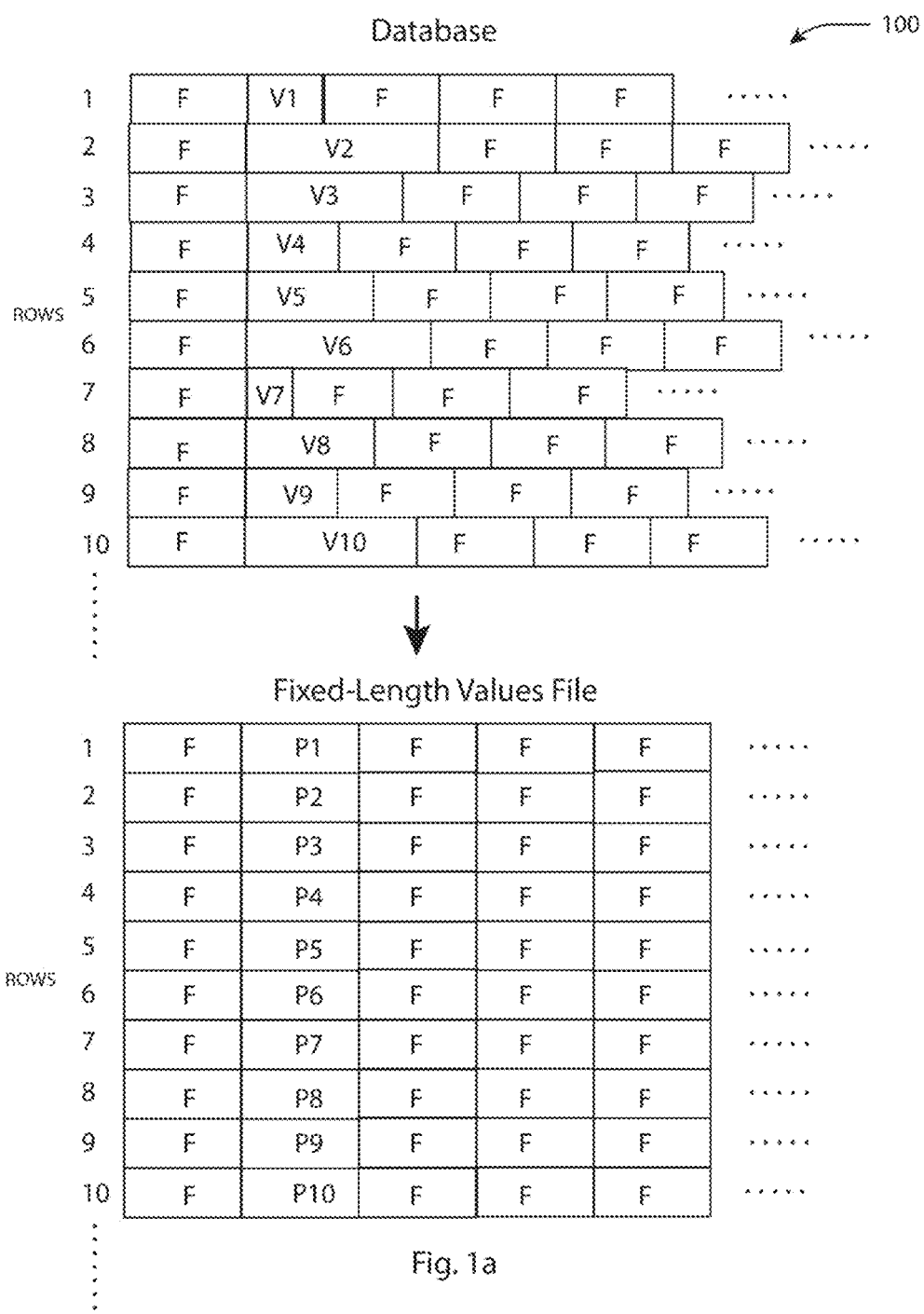
FIG. 1a. Diagram of database and Fixed Length Values file schema.
Figure 1B:
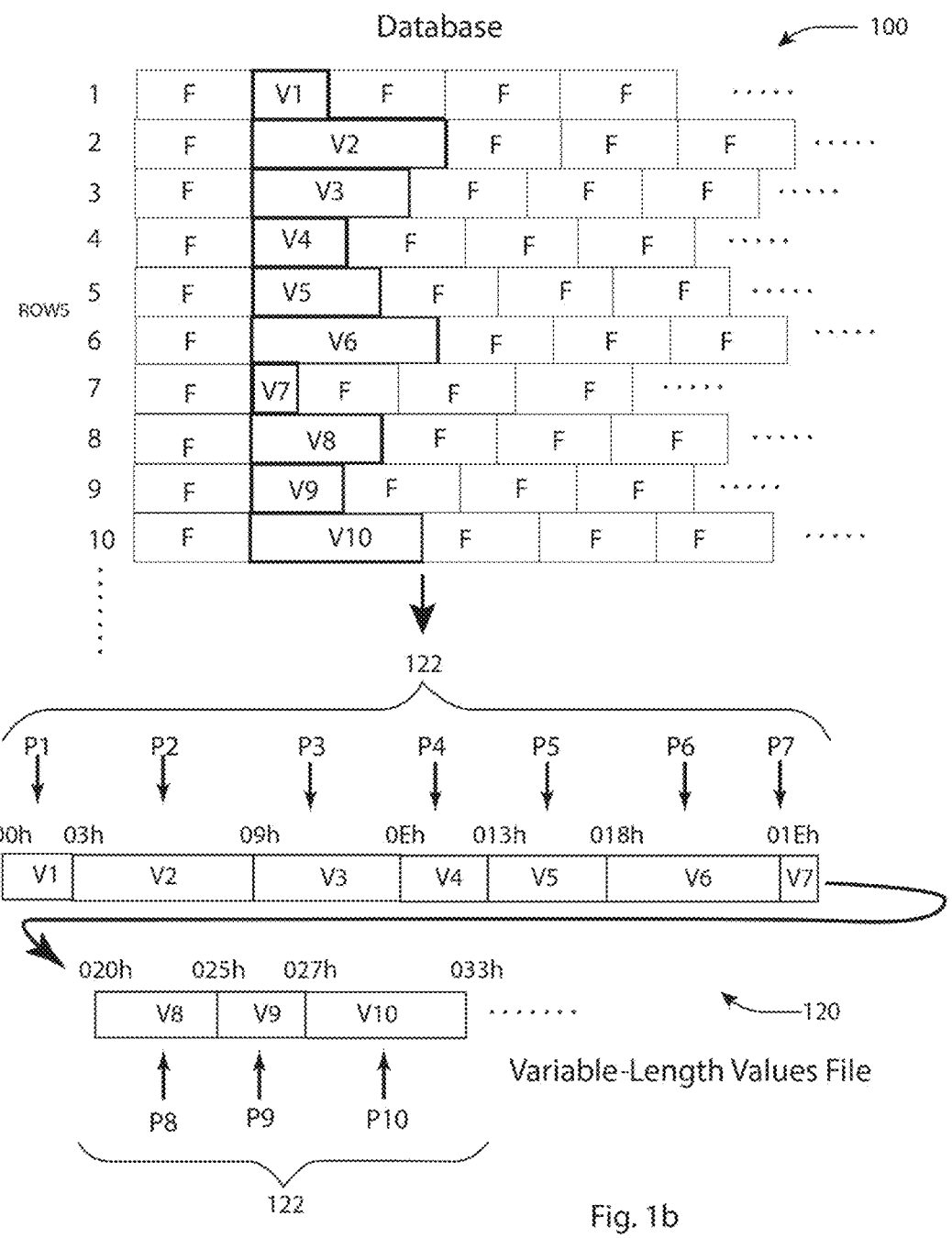
FIG. 1b. Diagram of database and Variable-Length Values file schema
Figure 1C:
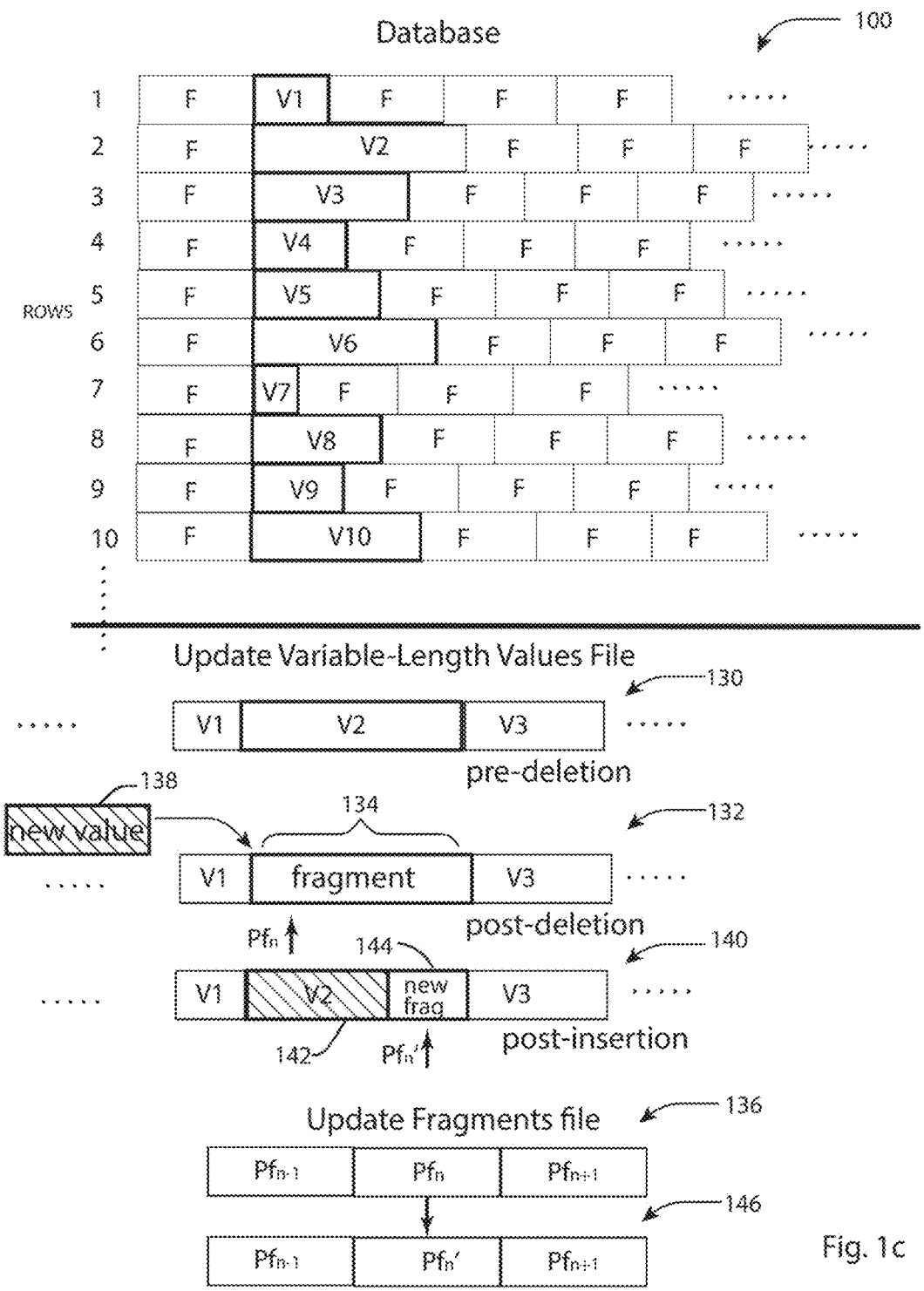
FIG. 1c. Diagram of database and update of Variable Length Values file.

As creation of the Fixed Length Value file and Variable Length Value file are fundamental to the innovative software method, a pictorial description of the process is shown in FIGS. 1a-c. Referring to FIG. 1a, database 100 is presented as a two-dimensional table, containing rows and columns. Database 100 comprises both fixed length and variable length data cells, in which length is defined in terms of numbers of bytes contained within a particular cell. Fixed-length values may comprise fixed length data types, such as short or long integers or floating point variables of fixed size, but may also comprise fixed-length string variables. Variable-length values may comprise variable-length strings, but other data types may be included in this definition [give examples]. Cells may be indexed as i,j, where i is the row index, and j is the column index. Fixed length data are labeled "F", whereas variable length data are labeled "Vx", where x serves as an index identifying the row wherein the value V is found, so that the variable length value cells are identified as V1, V2, etc.

The variable length cells Vx are arranged in a vertical order, where initial byte of each Vx occurs after a fixed number of bytes offset from the first cell in each row. A constant offset in each row allows the variable-length cells to be vertically aligned, forming the second column of the database table 100. The remaining columns of database 100 comprise fixed-length value cells. As shown in FIG. 1a, the fixed-length cells within the rows occurring after the variable-length cells, are not vertically aligned due to the presence of variable-length cells. Thus within a row, the initial bytes of each of the fixed length value cells following the variable-length cells occur at a different offsets from the beginning of each row. Fixed-length columns in the database 100 are assembled by the vertical order of cells within each row (index j) having a common index i. To process the database 100, software overhead may be required that to keep track of the changing lengths of the variable-length cells in each row, so that offsets from the beginning of each row may be calculated for each of the fixed-length value cells contained in each row.

As discussed above, the embodiments of the innovative software method create a fixed-length values file and a variable-length values file, wherein the fixed-length data of database 100 are collected and arranged in a Fixed-Length Values file, and the variable-length data of database 100 collected and arranged in a Variable-Length Values file. In the lower portion of FIG. 1a, an example of a fixed-length values file structure 110 is shown, where the Fixed-Length Values file 110 is derived from database 100. The structure of file 110 is organized as a two-dimensional table, following the structure of database 100, and may have the same number of rows and columns as database 100. In this example, file structure 110 generally reproduces the structure of database 100. However, the variable-length value cells, which form column 2 in database 100 are now replaced with fixed-length value cells in column 2 of file structure 110. In FIG. 1b, an example of the formation of a Variable-Length Values file structure 120 is shown, also derived from database 100. Thus, the separation of fixed-length and variable-length values in database 100 is accomplished.

As discussed above, the innovative software method provides for highly efficient database operations in part by reducing query overhead. In conventional database query software, part of the query overhead is searching for the offsets of the each of the data values contained within the database. In conventional SQL, data manipulation operations are performed directly on the database table. Each time a variable-length value is inserted, updated or deleted, the offsets of all the values following (within a row) may be shifted as the byte allocation may expand or diminish. As part of the query overhead in conventional SQL, the software must then recalculate offsets when searching values within the database table upon which future CRUD and other operations are performed. As an object of the instant innovation, this overhead is eliminated by the creation of a novel Fixed-Length Value file, serving as a proxy for database table 100. According to the innovation, any variable length values that are in the database table are copied into a Variable Length Values file in a particular order. In the Fixed-Length Values file, variable-length data are correspondingly represented as fixed length pointers. Each fixed-length pointer occupies a column and row position in the Fixed-Length Value File that corresponds to the column and row position that the corresponding variable length value occupies in the database table.

The Variable Length Values file may be a single dimensional vector as represented by 120 in FIG. 1b, containing the variable-length values in an order that they may appear in the database table, corresponding to the order of columns and rows in the database table. The innovative software thus provides methods wherein one or more fixed-length pointers 122, denoted as Px, where x is a number 1, 2, etc., corresponding to the position of the variable length value within the Variable-Length Values file. By way of example, each pointer Px 122 points to the offset of each variable-length value in the Variable-Length Value file 120 in FIG. 1b. Values of pointers 122 may be copied into cells occupying positions in Fixed-Length Value file 110 that correspond to the original i,j positions of the variable-length values in database 100. By way of example, column 2 of database 100 in FIGS. 1a and 1b contain variable length values, represented by cells denoted as V1-V10.

A Fixed-Length Values file may be structured in a way different from the example of file structure 110 shown in FIG. 1a, whereby the pointers 122 may be inserted into any of the columns of Fixed-Length Values file 110. Referring to FIG. 1b, pointers 122 comprise offset addresses of each of the variable-length values. By way of example, P1 points to the first variable-length value in file structure 120 of FIG. 1b, comprising an offset address of 00h. P2 thus points to the second variable-length value comprising an offset address of 03h, P3 corresponds to address offset 09h. According to the innovation, each pointer of the one or more pointers 122 have the same number of bytes, thus are the same fixed length, and may be inserted into the Fixed-Length Values file 110 in one of the columns, and read by the operation engine to find particular variable-length values found in the Variable-Length Values file 120. In embodiments of the innovation, when the query engine needs to perform a CRUD operation on a variable-length value, it may first search in Fixed-Length Value file 110 at the i,j position that the variable-length value occupies in database 100. There it may find the corresponding pointer to Variable-Length Values file 120, and access the variable-length value by parsing the offset address within Variable-Length Values file 120.

FIG. 1c shows a visualization of an update operation performed on a variable-length value residing in the Variable-Length Values file. Focusing on the lower half of FIG. 1c, a segment 130 of the Variable-Length Values file is shown, where a delete operation is about to be performed on value V2, delineated with a thick black border. In segment 132, value V2 has been deleted, and the segment 134 it once occupied is now labeled "fragment", where "fragment" denotes an open and therefore available segment, or fragment, 134 in the Variable-Length Values file 132. A pointer Pfn may be generated, where Pfn may point to the offset of the fragment 134 relative to the beginning of the Variable Length Values file 130. The pointer Pfn may also contain metadata, such as the length in bytes of the fragment 134 to which it points.

The engine then updates a previously created Fragments file, represented in FIG. 1c by segment 136, by inserting pointer Pfn in the (Update) Fragments file 136. In one embodiment, the Fragments file is a single dimension file containing pointers to offsets of fragments in the Variable Length Values file. At a later time, an update operation is performed where a new variable-length value 138 is to be inserted in the Variable-Length Values file segment 132. When a new or updated variable-length value 138 is available and ready to be inserted into the Variable-Length Values file segment 132, the engine searches the Fragments file for an available fragment that meets or exceeds the size requirement for space occupied by the variable-length value 138. Consistent with the events depicted in FIG. 1c, the engine may read pointer Pfn in Fragments file 136, which may also contain metadata indicating that the size of the fragment exceeds that of new value 138.

The engine may then insert new value 138 at the offset of fragment 134, where new value 138 is shorter than fragment 134, as indicated in segment 140. New value 138 now occupies the hatched region 142. Remainder fragment 144 is created by the insertion process, for which a new pointer Pfn' is co-generated. The engine may subsequently update the Fragments file by replacing the pointer Pfn in segment 136 with the new pointer Pfn', as depicted in segment 146.

Database Table Operations

Figure 2:
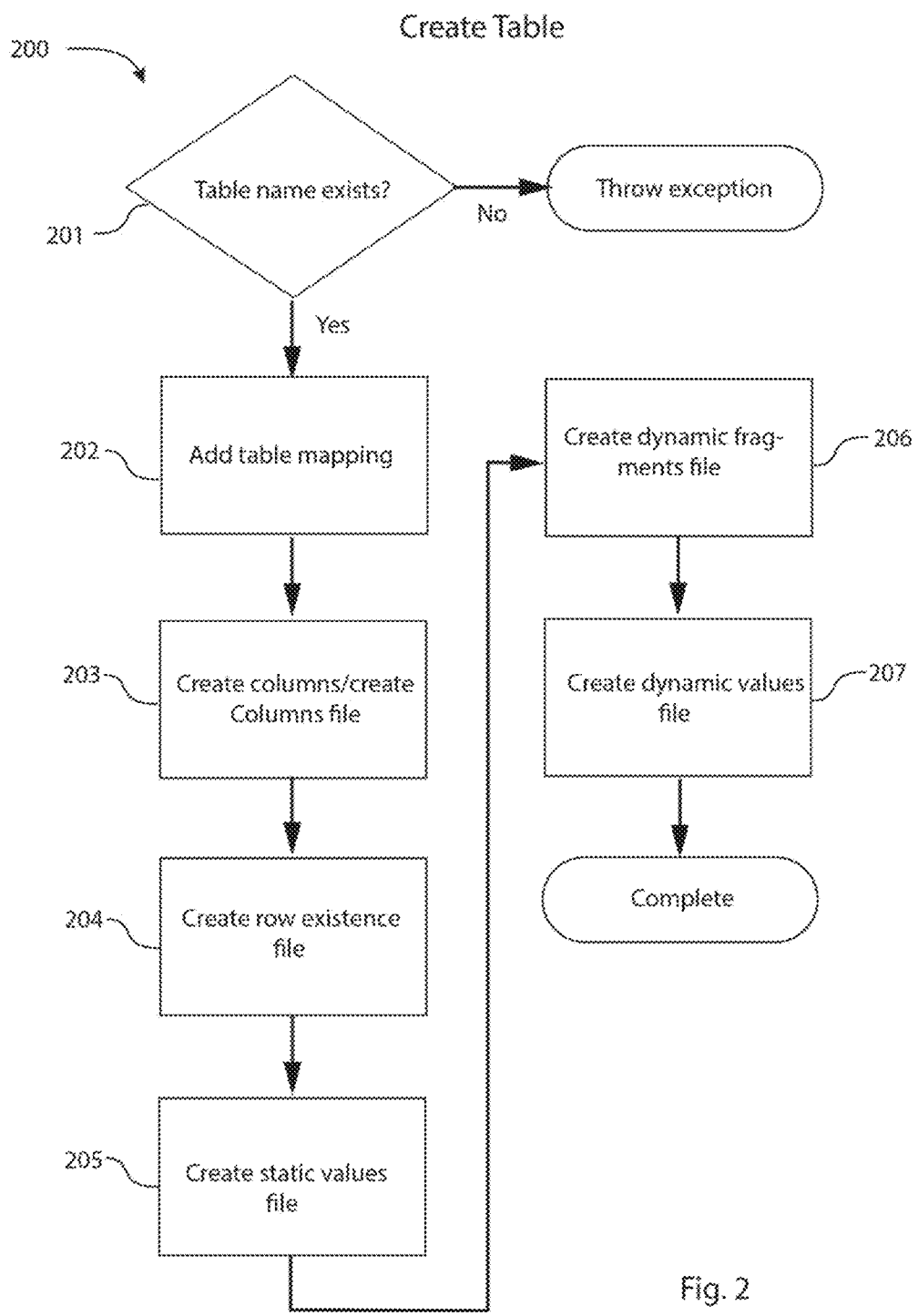
FIG. 2. Exemplary flow chart for innovative Create Table operation.

FIG. 2 depicts a flow chart of a 'create new table' operation 200. In one embodiment, the operation may comprise the series of steps 201-210 shown in FIG. 2, starting with a verification step 201 to determine whether or not the table name exists. A user first enters a suggested name for the new table, and the array variables are checked for previous creation of a table with the same name. If no table by the same name exists, a table is created. According to the innovation, a table mappings file is established in step 202 to provide a means to track table names for further creation of files associated with the newly created table, such as the Fixed Length Values file, the Variable Length Values file, and the Row Existence file, as described above. Subsequently, a Columns file is created in step 203.

The Columns file contains all of the column metadata for the newly created table. For each column in the newly created table, the metadata of the Columns file may comprise fields stocking information, such as, but by no means limited to: a field containing the column name; a data type field containing the type of data contained in the column; a field indicating whether or not the values or records contained within the particular column are nullable types (or a NOT NULL constraint has been placed on the particular column or entire table); a field indicating whether or not a UNIQUE constraint is placed on the column; and a field containing the table index for the column position.

After columns have been established, the Row Existence file is created in step 204. The Row Existence file provides a storage means for the instant method to keep track of existing and deleted rows in the newly created table. According to the innovation, row deletion is performed by simply marking rows using a flag, or bit marker to represent an existing or deleted row. By virtue of using flags to mark deleted rows, the instant method provides a significant advantage over full-fledged conventional row deletion operations, typically used in conventional SQL, in terms of operation speed and overhead reduction by eliminating the processor time to call and execute memory management functions (I/O layer or API layer operations) that perform the operations of row deletion/insertion and re-organization of the table (i.e., shifting rows, updating the schema). This is a particularly important speed advantage when managing very large databases, particularly from mobile devices. Furthermore, the instant method provides for physical row deletion deferral to clean-up operations that may be performed in the background between queries and other idle periods when speed is not critical.

The Row Existence file fields contain serialized bytes that represent collections of eight bits each, wherein each bit is a flag for a row in order of the bit position. By way of example, row existence bits that are set (logical 1 value) represent an existing row, and bits that are cleared (logical 0 value) represent rows that have been deleted. However, the logic is not limited to this scheme, and the reverse logic may be used, viz., bits may be set when corresponding rows are deleted. Bytes in the Row Existence file may be processed by bitwise or binary Boolean byte scanning operations to read the status of individual rows.

Each byte in the Row Existence file represents eight rows, where sequential rows are represented sequentially by each bit. For example, byte0 represents rows 1-8 (0-7) in the table, byte1 represents rows 9-16 (8-15), etc. The bit order may be arbitrary, for example, the right-most bit of the byte, the least significant bit (lsb), representing the row with the lowest index, the left-most bit of the byte, the most significant bit (msb), representing the row with the highest index, wherein the row order in byte 0 may be byte0=|msb=row7, row6, row5, row4, row3, row2, row1, row0=lsb|. The reverse order may be utilized as well, wherein the msb represent the lowest-index row, viz., byte 0=|msb=row0, row1, row2, row3, row4, row5, row6, row7=lsb|. When bits containing a logical 0 (or alternatively a logical 1) representing a deleted row are encountered by the scanning operation, the row index may be obtained by obtaining the bit position or positions within the byte for non-zero bit values, and then added to the product obtained by multiplying the number of bytes preceding the one currently being scanned by eight.

As an example, row 50 of the table may be represented by 50 mod 8=2, where 2 is the remainder of the modulo operation. The result may be translated to the second bit (relative to the lsb or msb) in the $7^{th}$ byte in the byte series corresponding to the $50^{th}$ row in the table. For the purposes of this disclosure, the $7^{th}$ byte may be referred to as the remainder byte. For row insertion, bits may be set sequentially in the remainder byte. Additional bytes may be appended to the Row Existence file as the table grows larger, i.e., as new rows are inserted. However, this does not necessarily indicate that new rows are appended to the end of the table. In general, rows may be inserted anywhere in the table, the Rows Existence file is updated by expanding the byte count keep track of points of potential row insertion. When a row or rows are deleted, the instant method provides for a procedure to update the Row Existence file (bit set/clear operations) at the byte and bit position corresponding to the row index in the table.

A further advantage of the provision of the Row Existence file is that the file size can be compact due to the use of bit flags to represent each row in a table. In very large databases, the number of rows may number upwards of one million. For instance, for a table with 100,000 rows, a Row Existence file for this table would be approximately 12 MB in size. An example of when the compact file size is advantageous is when the application must search the table to find where (at which index) new rows may be inserted, for instance to replace a deleted row. In conventional methods, the entire table must be searched. Such table files may be hundreds of megabytes to several gigabytes in size for large databases. Searching a compact file such as the Row Existence file as described is obviously much faster.

The instant method further provides for increased efficiency by copying all static, or fixed-length values, that is, those values that have fixed byte length, that are contained in a table into a separate file, referred to as the Fixed Length Values file (step 205, FIG. 2). The structure of the Fixed Length Values file mimics the table schema, but is populated only with fixed-length values at the corresponding indices for those values. If variable-length (dynamic) values are also contained in the table schema, these values are not copied directly into the Fixed Length Values file, but are copied by reference using a pointer of fixed length, as well as an accompanying integer indicating the length of the variable-length value, in lieu of the values themselves. The fixed-length pointer and length value representing a dynamic value fragment may be stored within the Fixed Length Values file at the row and column indices corresponding to those of the dynamic value from the original table. The variable-length values fragments themselves are copied to a Variable Length Values file, and the pointer may point to the position in this file where the particular dynamic value is stored. This aspect of the instant method facilitates navigation through the Variable Length Values file. More details on this aspect of the instant method are discussed below.

Advantageously, the data structure contained within the Fixed length Values file may act as a surrogate for the represented table as is particularly advantageous if the table contains both fixed-length (static) and variable-length (dynamic) values. Search and other table operations may be executed much faster because the scan operations do not need to determine the length of each column and row to know how many bytes to jump to find the next value, or to calculate the row lengths to navigate the table.

Still referring to FIG. 2, step 207 embodies the creation of the Variable Length Values file. As eluded to above, this file holds variable-length, or dynamic, data values, or those whose size cannot be fixed or predetermined when designing a schema for the database table. Dynamic values stored in this file may be referred to as fragments of the table, and may be stored at offsets or addresses within the file that are referenced by the pointers stored in the Fixed Length Values file at the same row/column location in the table schema, as disclosed above. Also as disclosed above, a value indicating the fragment length may accompany the pointer. In this way, variable length fragments, which may exist in one or more particular columns in the original table, may be easily found in the Variable Length Values file by scanning the appropriate column in the Fixed Length Values file table. As an example, it may be desired to delete a variable length column from the entire table. A related file called the Fragments file is created in step 208, which keeps track of the gaps in the Variable Length Values file when such deletions take place, playing a role similar to that of the Row Existence file.

Figure 3:
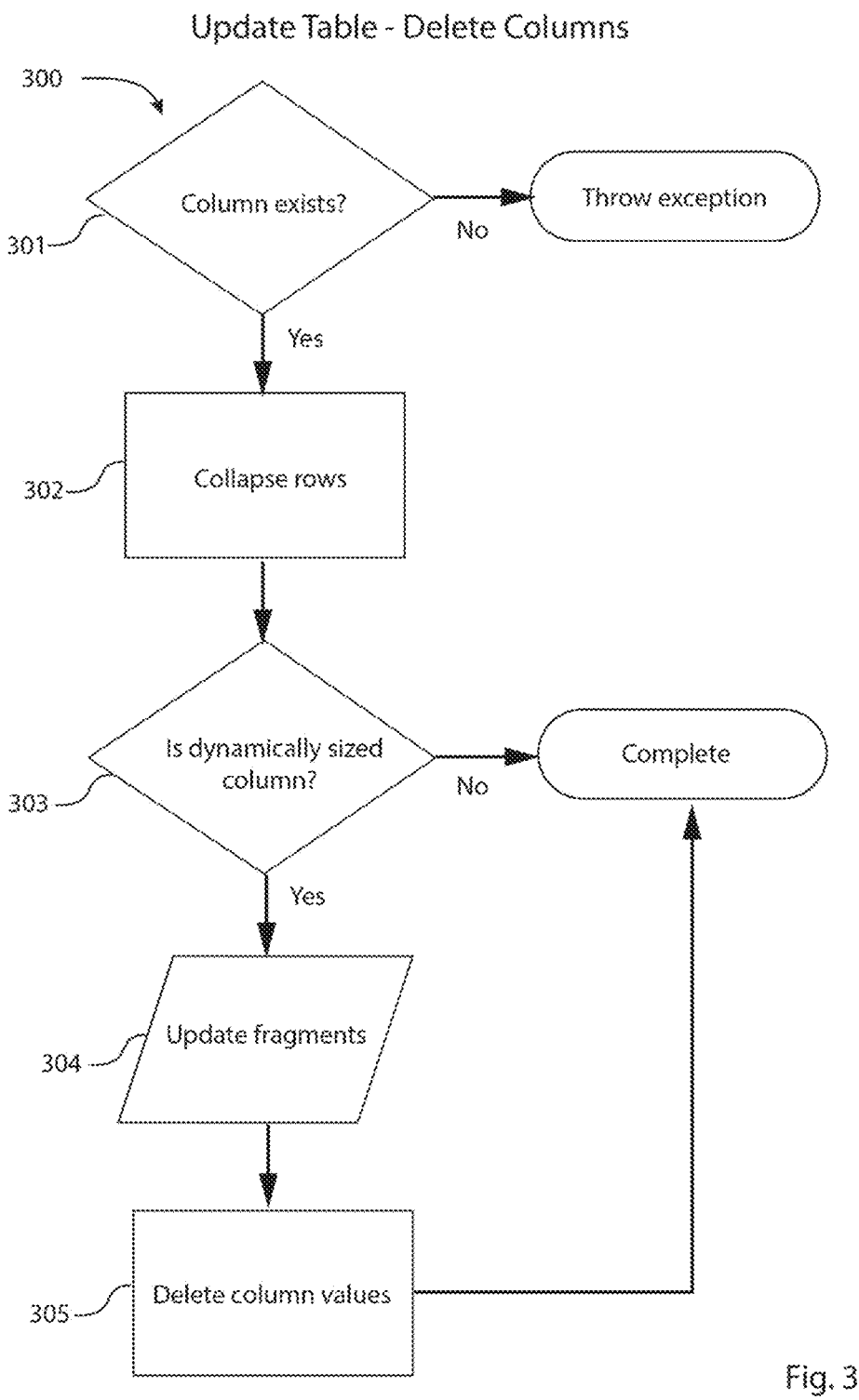
FIG. 3. Exemplary flow chart for innovative Delete Columns operation.

Once the table is created, various operations may be performed to manipulate the data contained within. The instant dbQW method comprises a plurality of operations that are performed against the database table created in the table creation operation of FIG. 2. FIG. 3 shows the flow chart 300 for column deletion in the created table. Typically, the number of columns in a database table are few in comparison to the number of rows. Therefore, operations on entire columns do not require high speed as a result of the innovations of the instant dbQW method. The column deletion operation first verifies the existence of the column chosen for deletion by verifying the name in step 301, by querying the Columns file created at the time the table was created. If the column has been verified, the elimination process occurs by collapsing rows in step 302, that is, for example, to shift columns in the Fixed-Length Values file to the right or left, depending on which side of the deleted column they are located within the database table.

This operation is faster and more streamlined in the innovative dbQW method in comparison to conventional SQL counterpart operation, requiring far less overhead than convention SQL. By virtue of the Fixed Length Values file serving as the proxy for the database table, the innovative dbQW method operates on the Fixed-Length Values file in lieu of the database table itself. The database table itself is not operated upon directly. Knowledge by the engine of the fixed byte length of each column in the Fixed-Length Values file greatly enhances the speed of row collapsing, as entire columns can be shifted at a time as opposed to individual rows at a time.

In order to collapse the rows, several operations are carried out on the separate auxiliary files. First it is determined in the column be deleted contains variable length data, as is determined in step 303 of FIG. 3. If so, the number of bytes that must be deleted is different in each cell of the column. In a conventional SQL row collapsing operation, the deletion must then be carried out row by row. By way of example, the variable length values contained in the column may be string values for street addresses or names. Each row represents an entity having the address and/or name, which are variable length string data. A conventional SQL delete row collapsing operation must delete each variable-length cell one at a time, until the end of the column is reached.

The instant dbQW method affords the advantage of collapsing all the rows at the same time. In a first instance, the fragments contained in the Variable Length Values file are accessed by the pointer references contained in the Fragments file in step 304, and are deleted all at once, or marked as deleted, thereby updating the Fragments file. Once this is done, the pointers in the Fixed-Length Values file that reference the variable-length values contained in the Variable-Length Values file are all deleted in step 305. Columns to the right are shifted by a fixed and known number of bytes, equal to the pointer length in bytes, to the left. The database table itself is then adjusted as a background operation between query operations.

Figure 4:
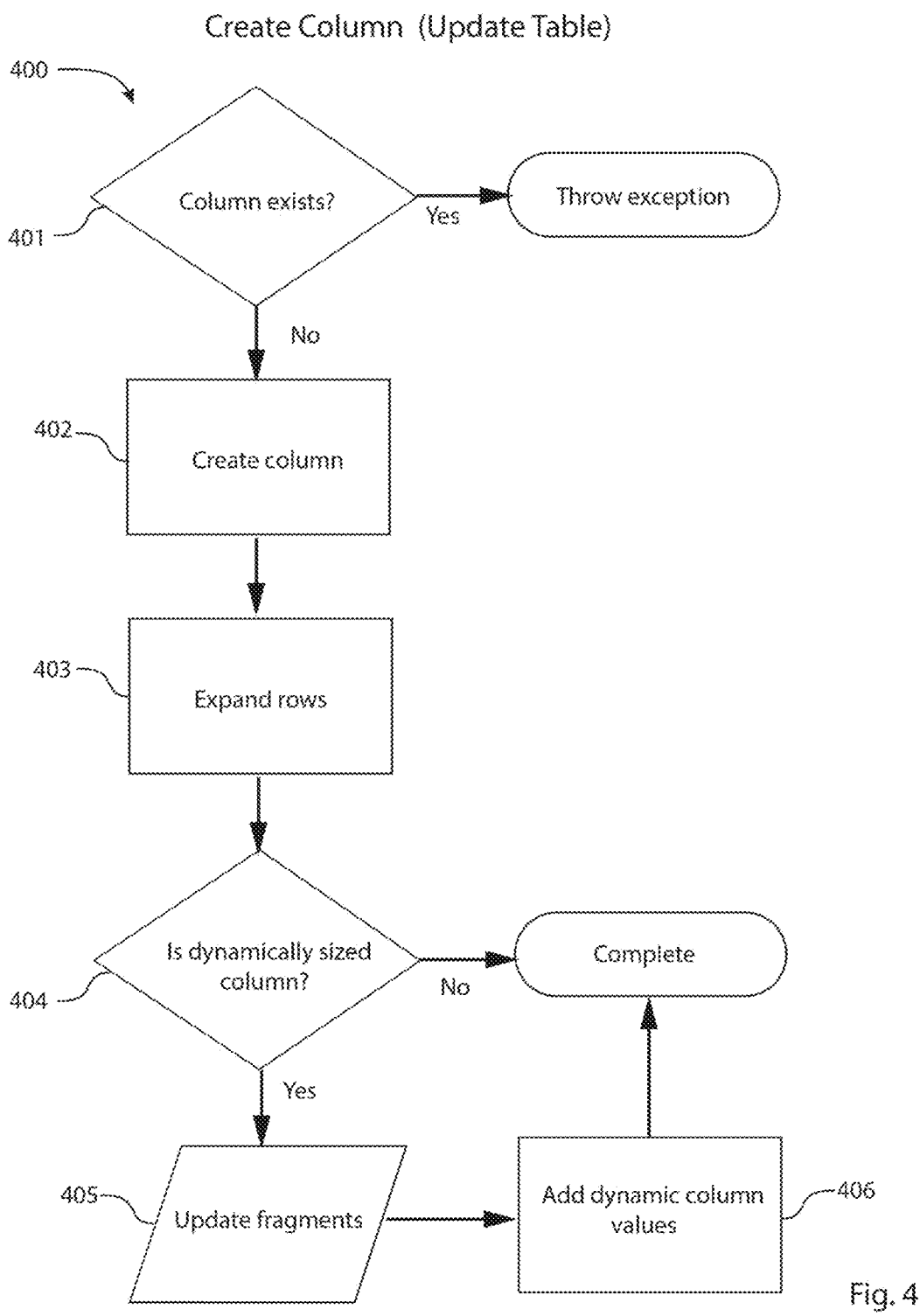
FIG. 4. Exemplary flow chart for innovative Create Columns operation.

One embodiment of a dbQW innovative method for new column insertion is represented as flow chart 400 in FIG. 4. This operation is performed on the Fixed-Length Values file, with updates to the Variable-Length Values file and the Fragments File if the new column is a variable length values column. The operation essentially comprises expansion of rows to accommodate the new column. If a column of fixed-length values is to be inserted in the database table, this is done in the innovative dbQW method by moving data in a row to the right in the Fixed-Length Values file, thereby expanding the rows by a known amount of bytes in step 403. In step 404, a check for dynamic sizing for the column is performed. If this is not the case, the process is complete. If the column is flagged for dynamic data, then the Variable Length Values file is updated with new dynamic data in steps 405 and 406.

Figure 5:
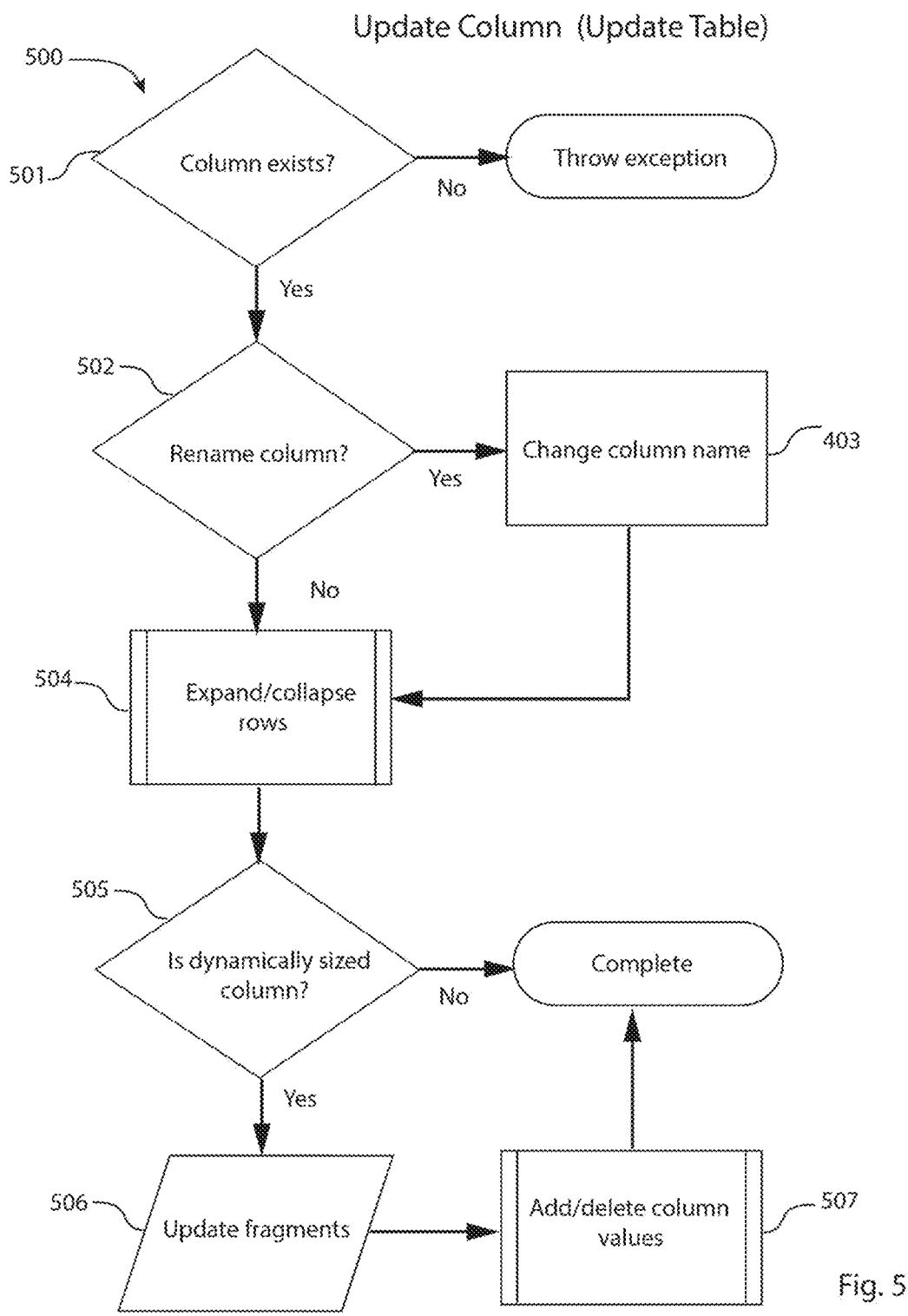
FIG. 5. Exemplary flow chart for innovative Columns Update operation.

It may be desired to update an entire column. An update column process is depicted in FIG. 5. After an initial check of the column's existence in step 501, update column operation 500 asks if the column is to be renamed in step 502. If the column is to be renamed, this task is performed in step 503, and program control is returned to step 504. If the name remains the same, control is passed to step 504 as well. Step 504 embodies the operation of updating a column comprises deleting values, substituting values, into individual rows (cells). Deletion of a value without replacing the value is possible in nullable columns. The instant dbQW method then performs the check for enablement of variable-length column (step 505) as above. If a column value is to be updated, for instance, the query operation scans the Fixed Length Value file to locate the row containing the value to be updated. The column index, sent by the query, then pinpoints the proper column, therefore the cell containing the value to be updated is accessed. As disclosed above, variable-length values are referenced by pointers, which are surrogates for the actual values, and point to the location of the variable-length values contained in the Variable Length Values file. Therefore, the accessed cell contains the pointer to the variable-length value fragment to be changed, and then proceeds to update the fragment in step 506, whereby the value is passed by the query through the I/O layer, and the innovative method performs the add and delete operation on the value or values contained in the Variable Length Values file (step 507).

Figure 6:
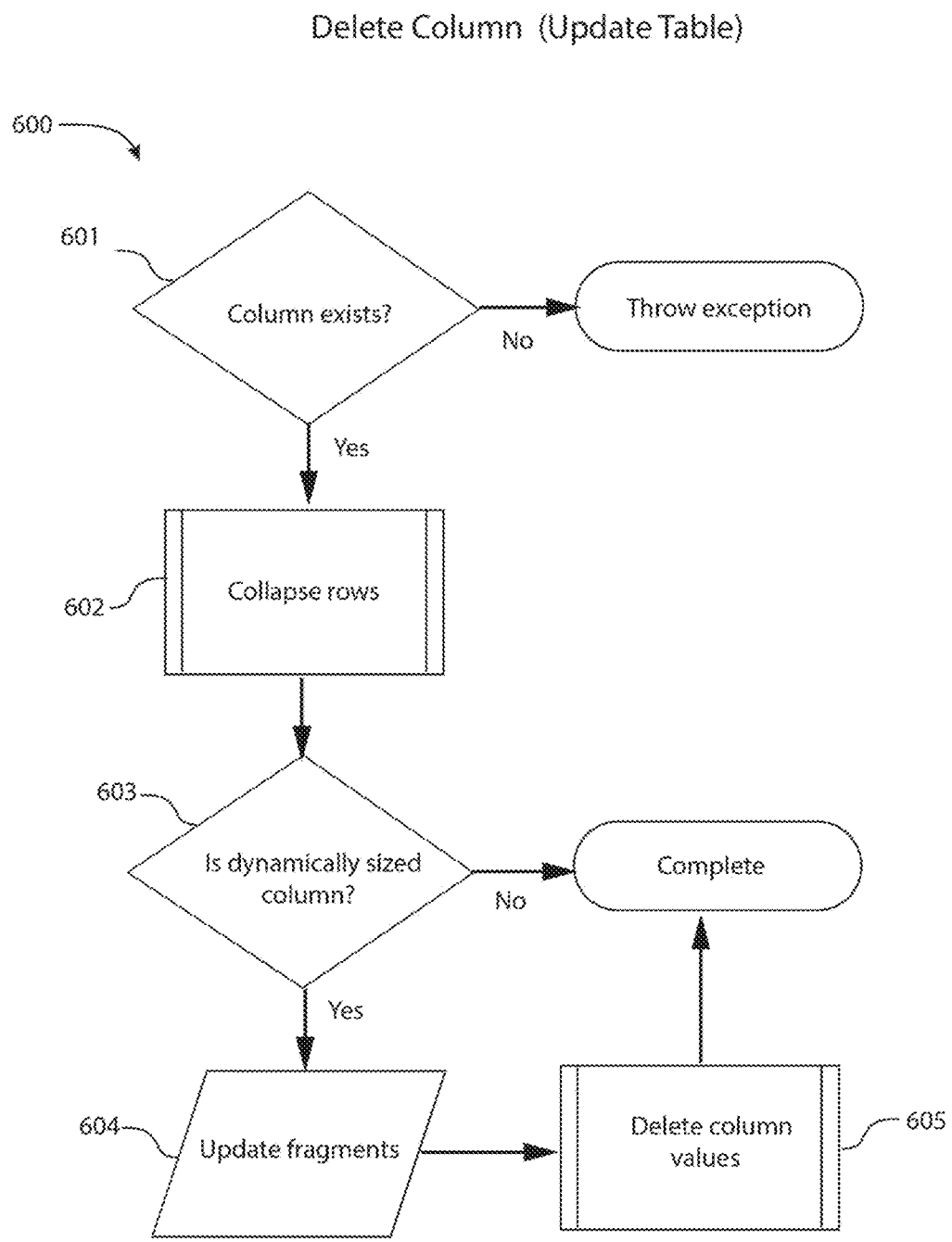
FIG. 6 Exemplary flow chart for innovative Delete Columns operation.

FIG. 6 shows a flow chart for a column deletion operation, which as shown is effectively the reverse of the column insertion operation. The essential difference between the two operations is step 602, the collapse rows operation (as opposed to expand rows) and delete column values in step 605. Similarly to the insert rows operation depicted in FIG. 4, the Fixed Length Values file is first scanned to the column index to read the column attributes (if column exists). If the column contains fixed length values, the rows of the fixed length values table are all collapsed (step 602) by shifting the row data by the number of bytes allocated to the column width. If the column is enabled to contain variable length values (step 603), the values contained therein are pointers referencing the Variable Length Values file. The column to be deleted is scanned to process the pointers and gain access to the variable length value fragments that the pointers reference. Once accessed, the variable-length value fragments are deleted, or marked as deleted in the accompanying Fragments file (or replaced with null values, for instance, step 604). If variable length values are not physically deleted in the Delete Column operation, they may be in a later clean-up operation during an idle period in step 605. Once the variable-length values have been deleted, the fixed-length pointers can be collapsed (step 602).

Figure 7:
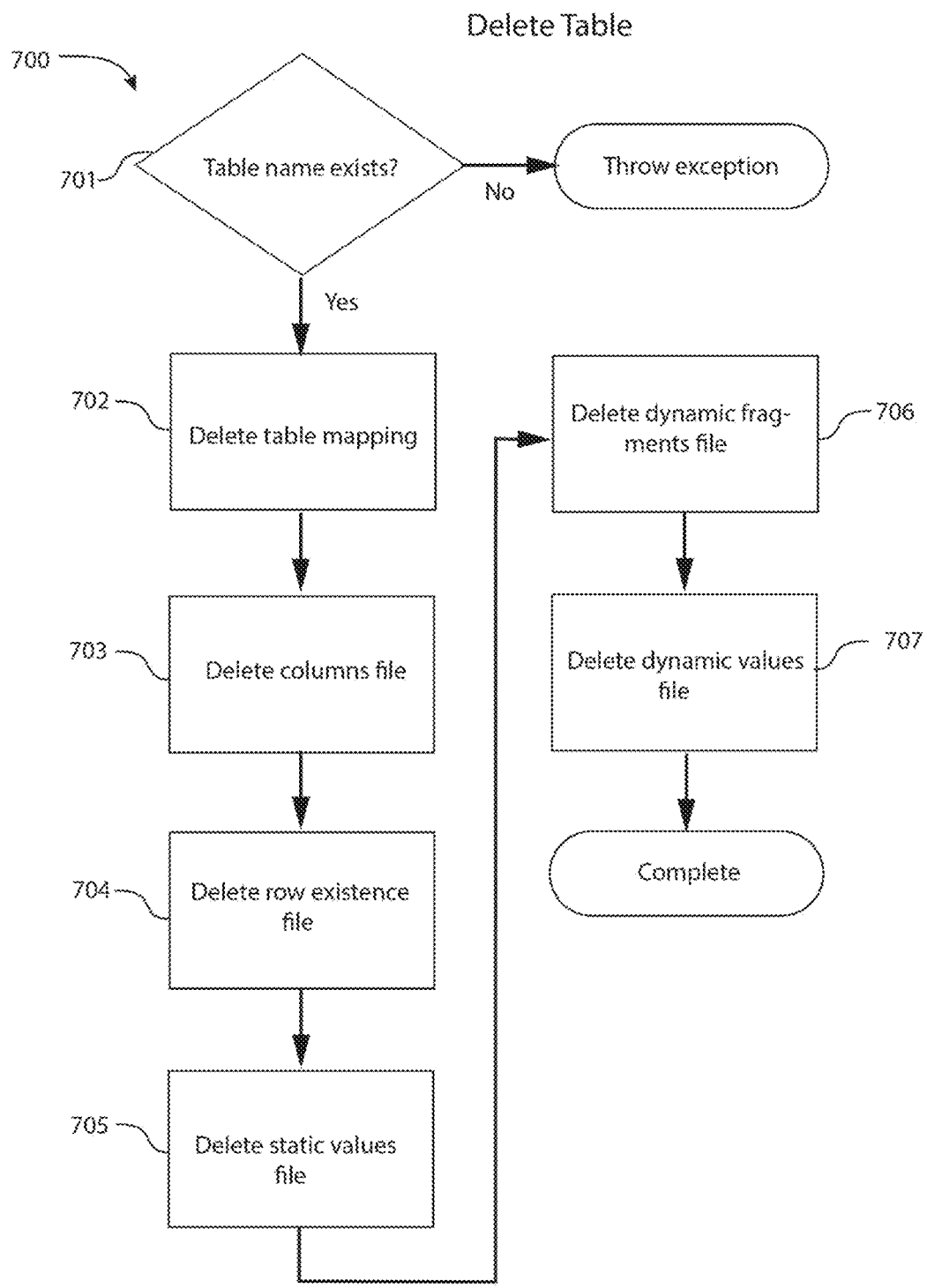
FIG. 7. Exemplary flow chart for innovative Delete Table operation.

In FIG. 7, an exemplary table deletion operation is shown by flow chart 700. The innovative features of this operation are the access to the inventive Row Existence file, the Fixed Length Value file and the Variable Length Values file and the Fragments file. These delete operations are performed in steps 702-707 in FIG. 7.

Figure 8:
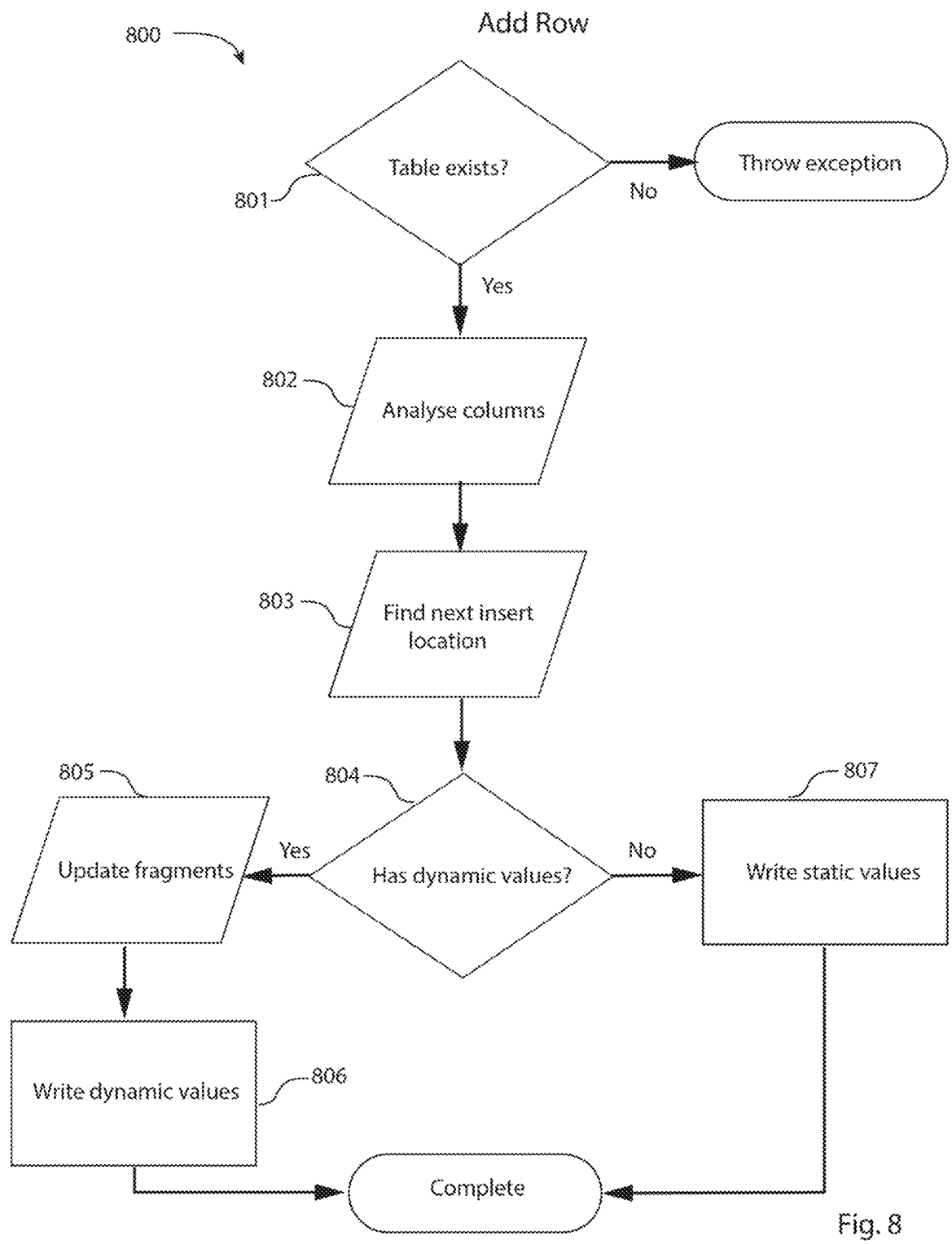
FIG. 8. Exemplary flow chart for innovative Add Row operation.

In FIG. 8, an exemplary "add row" operation is shown by flow chart 800. After initial check for the existence of the table in step 801, the columns are analyzed in step 802. In step 802, a list of objects is assembled, wherein the list contains information about the columns, comprising, but not limited to, type, size, nullable, and column index. The list allows the analysis of the abstract syntax trees to map directly to the schema of the files. The program engine searches for the next insert location using a data scan operation in step 803. This may be carried out by scanning the Row Existence file, and searching for rows that have been previously deleted in the Fixed Length Values file. According to the instant innovation, these rows are represented by zeros in the Row Existence bytes. Thus, these bytes are scanned for zero bits by logic built into the function containing the method. By way of example, a byte in the Row Existence file containing a value less than 255 (FF hex) contains zero bit values, each zero bit indicating a deleted row. The query may convey a specific row index, whereby a row had been previously deleted, and a new row is to be inserted at same index of the deleted row. The query may also be inserted at random in the table, requiring the query to command a scan of the Row Existence file to find the next available deleted row (see above) and insert the new values into the cells of the deleted row. The new row may also be appended to the end of the table.

If any of the columns are variable-length types, as determined in step 804, program flow shifts to step 805. In this step, and as explained above in reference to FIG. 1c, the engine scans the Fragments file for previously deleted fragments large enough to contain the variable length value to be inserted. If the engine finds a suitable fragment, data in the form of the variable-length value is placed in the Variable Length Values file. Information on the fragment that has been accessed is updated in the Fragments file. This information may comprise the new offset and length of the available segment. Pointers are prepared for insertion into the new row in the table contained in the Fixed Length Values file. In step 806, the new variable length values, which are referenced by the pointers inserted into the Fixed Length Values file, are written to the Variable Length Values file. For example, the variable-length values may be appended to the end of the Variable Length Values file. In step 807, any static values that are assigned to the new row are directly written into the table in the Fixed Length Values file at the new row index.

Figure 9:
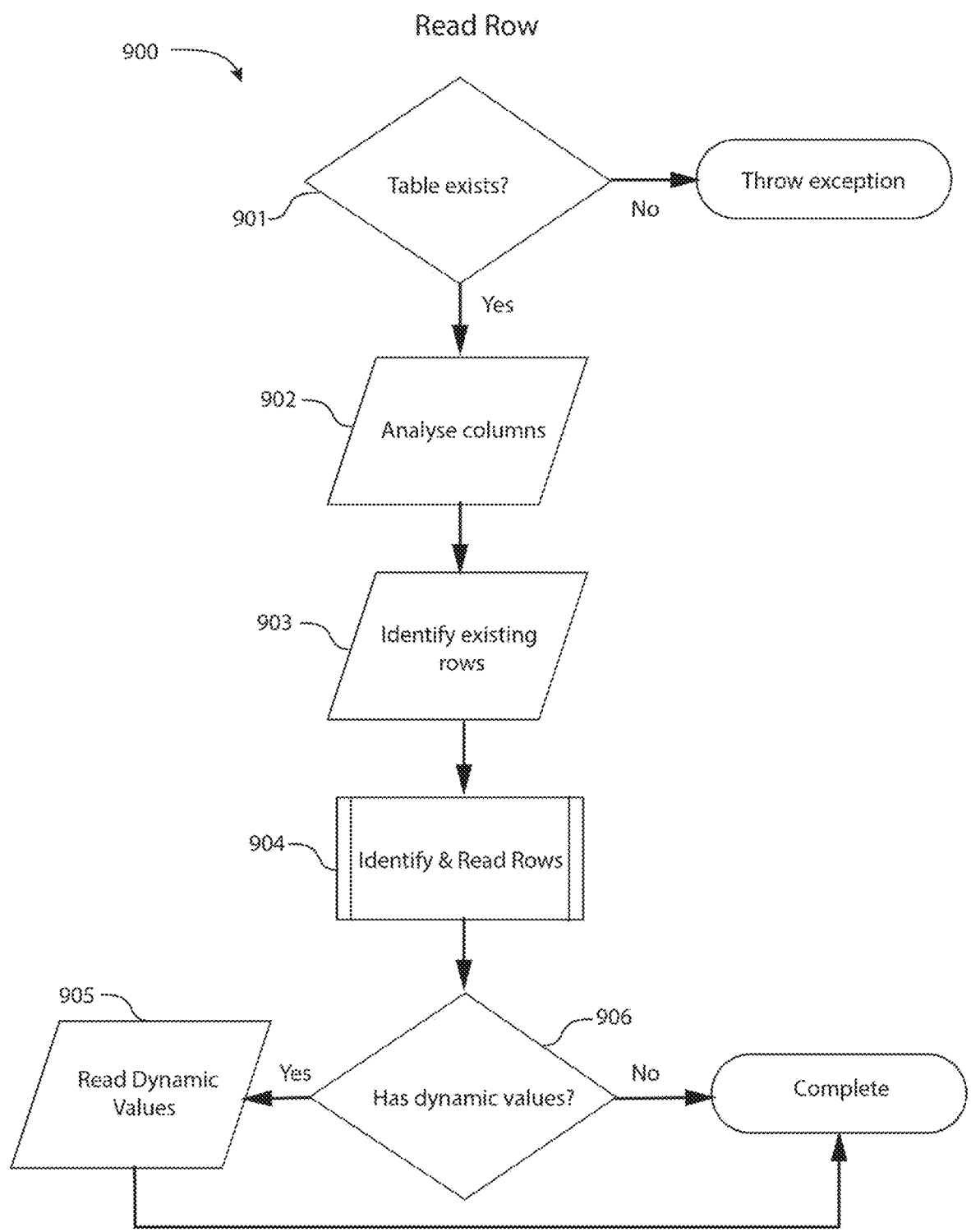
FIG. 9. Exemplary flow chart for the innovative Read Row Operation.

The operation of Read Row, shown in the process flow 900 of FIG. 9, comprises the salient steps of using, in step 902, the analyze columns methods to determine if the columns may be nullable, if they contain fixed or variable length data. In step 903, existing rows are identified, according to the innovation by analyzing the Row Existence file, as described in detail above. The Read Row operation is called by queries that retrieve row contents, and may pass the row index or identifier for one or multiple rows. In step 904, the operation finds the row or rows identified in the query, and contents are read. The read process asks if the row contains variable length values in step 805. If found, the variable-length values are read in step 906, where the variable length values are read from the Variable Values file. Step 905 may be executed at compile time of the engine, and step 906 during runtime.

Figure 10:
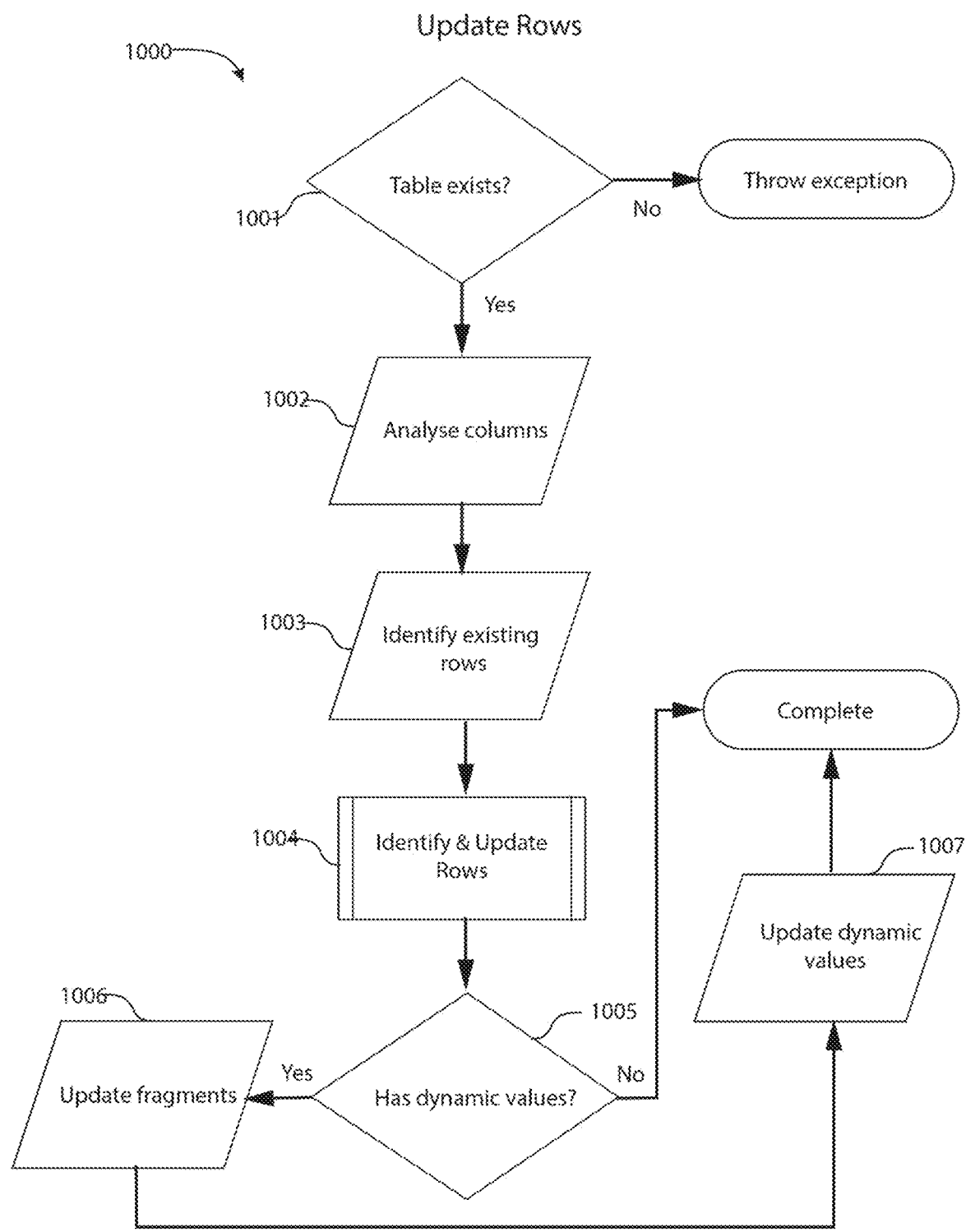
FIG. 10. Exemplary flow chart for the innovative Update Row Operation.

The operation of Update Rows, shown in FIG. 10, rows values are updated by operations that will change data stored in a particular row. The process goes through the usual steps of checking the table file to verify the existence of the table 1001, then scanning the Columns file in step 1002 to determine the type of columns present in the table, such as fixed length columns, variable length columns and nullable columns. Once existing rows, that is, rows that have not been deleted, are identified in the Row Existence File in step 1003, existing rows that are targeted for updating are identified in step 1004. Various methods may be employed to find targeted rows, such as parsing each for to search for a search term launched in the query.

If variable length values are present (step 1005), then special processing is carried out to update these, if necessary. Fragments are updated (step 1006), and then dynamic values are updated in step 1007. According to the innovation, dynamic values are updated in the Variable-Length Values file, which are pointed to by pointers in the updated row.

Figure 11:
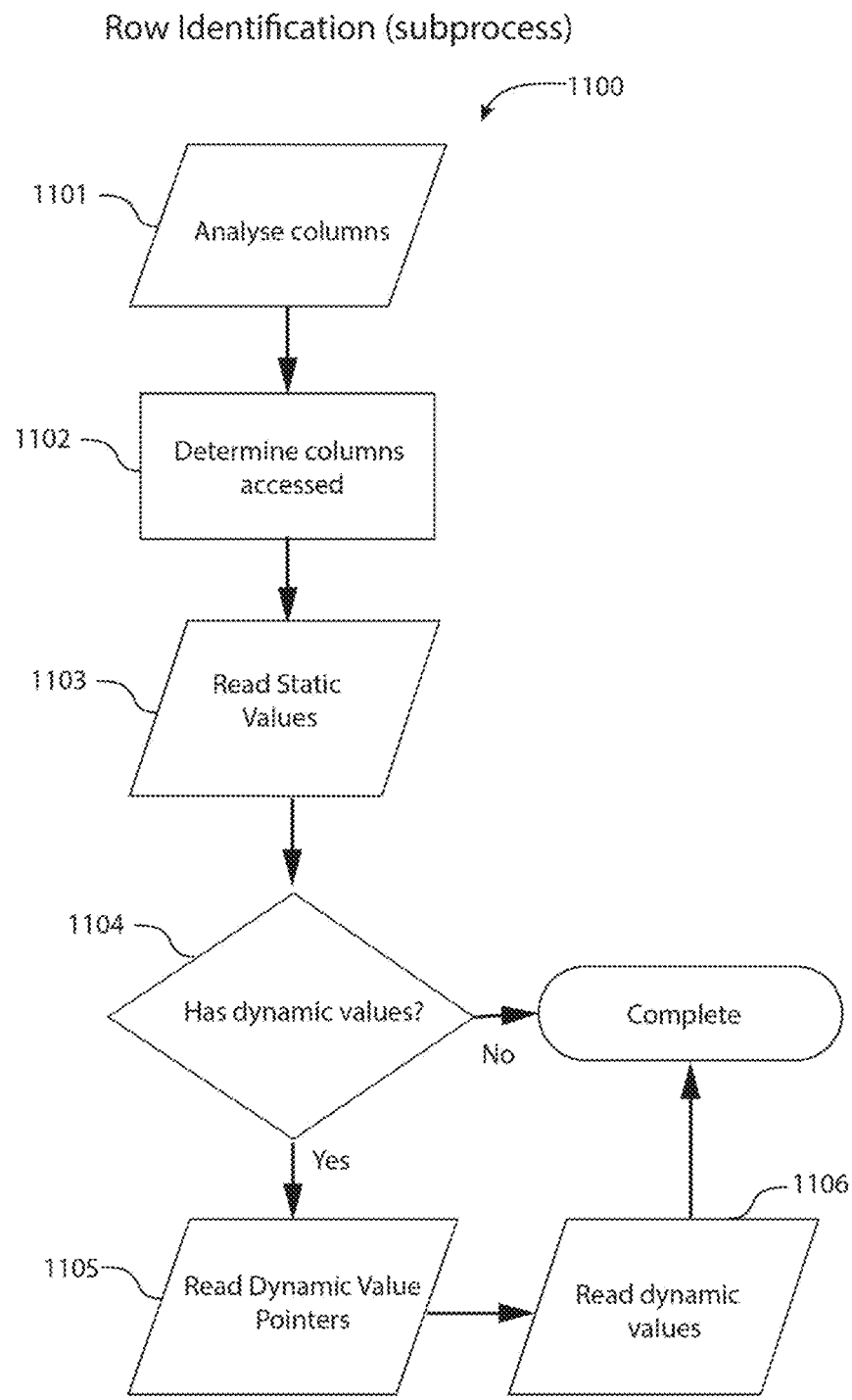
FIG. 11. Exemplary flow chart for the innovative Row Identification Operation.

In FIG. 11, the subprocess of row qualification is shown in detail. Several operations described leverage the row qualification subprocess. Row qualification is a subprocess of an entire operation. Because many operations need to qualify each row before determining whether or not to execute their operation against them, a common row qualification subprocess exists to facilitate that. Before the table is scanned, the columns being accessed for qualification are determined by analyzing the user supplied syntax tree. The analysis identifies which columns are being accessed and replaces the determining expressions within the syntax tree with new expressions that access the column value via its column index. This allows the logic surrounding the retrieval of the column value to remain the same. The portion of the syntax tree that qualifies an operation is expected to return a true or false value that indicates whether or not that row qualified. The true or false value is represented by one or many expressions within the qualification portion of the syntax tree.

Syntax Tree Generation

The innovative software method comprises a syntax tree-generation/augmentation engine to which a syntax tree is passed, and that syntax tree is translated/altered, then compiled, then executed. The final syntax tree comprises expressions and statements, both from the user specified syntax trees, and expressions and statements generated by one or more operations, thus combining multiple operations into a single execution so that the engine will minimize scans against the associated files. The operations are themselves generated by performing queries against a formatting layer. The formatting layer contains classes that are instantiated into loosely-coupled objects according to a generic format for tables/rows/columns. The objects of the formatting layer of the innovative software are adapted to analyze the queries and generating the set of operations related to the query.

The query is passed to the formatting layer preferably as lambda functions, but depending on technology, may be a set of objects that represent a syntax tree. As an example, the generic object/syntax tree generates one or more operations that translate the original syntax tree into the syntax tree to be executed. The function contains one or more column or row identifiers, allowing the analyzer to determine the row or columns identified in the syntax tree. Once the syntax tree is generated, it is compiled at runtime to one or more methods that are used against the database files as described above.

An example of this process is described below.

When a user submits a query to the engine, the query may contain a lambda expression. For example, the following query may be used:

await context.People.AllAsync(p=>p.Id>5)

[where keywords such as the keyword "await" are designated by using italic font. Here, await tells the runtime engine that this method should be asynchronously awaited, allowing the calling thread to continue processing messages while the query is executed in a background thread. The method "AllAsync" is a novel method unique to the innovative dbQW query language, and is similar to the "All" method familiar to IEnumerable and IQueryable interface implementations. However, here it allows the query to be executed asynchronously without the need to be wrapped within an asynchronous function, as that would require extra code.

The context is the root part of the method chain that is connected to the database being queried. It keeps track of which tables are present. When implemented, it may return a property which is a type object that exposes methods such as AllAsync. The predicate:

p=>p.Id>5 is the lambda expression representing the query submitted by a user. This is an example of a hardcoded lambda expression, but it may also be generated as an abstract syntax tree, and passed to the execution as a parameter. The lambda expression arguments holds a "p", a conceptual representation for each row, or person in a table that contains "people". The body of the lambda expression, "p.Id>5", identifies a specific column of the person table as that which holds the ID number of each person. Therefore, the query asks for the execution to iterate through all rows and identify those wherein the ID number is greater than 5.

When AllAsync is called, the analysis of the query is performed by the innovative dbQW execution engine. At this time, the engine receives a list of operations and builds an execution plan. From the plan, the engine compiles a function, which may be a lambda expression that is executed. The lambda expression contains an expression tree in the body. The methods may create one or more operation objects when executed. As an example, the AllAsync method of the instant innovation creates an operation object upon execution. The one or more operation objects are then passed to the execution engine. The engine may then analyze the set of operations to create an execution plan.

The execution plan is optimized for highest efficiency by the engine. For example, the engine observes the order of table scans for operations that may be grouped and executed together sequentially. According to the instant innovation, two novel interfaces are provided to facilitate execution, one called IExecutableOperation and IScanningOperation. The former interface is responsible for interacting with the I/O layer, and may contain at least one method to direct execution of methods. IScanningOperation may have a plurality of methods that define interaction with data, and how the execution is performed. All operations that inherit from IScanningOperation are responsible for defining a list of necessary scans pertaining to the operation being analyzed and identifying the table they access. The scan list is then further analyzed by the execution engine.

Figure 12:
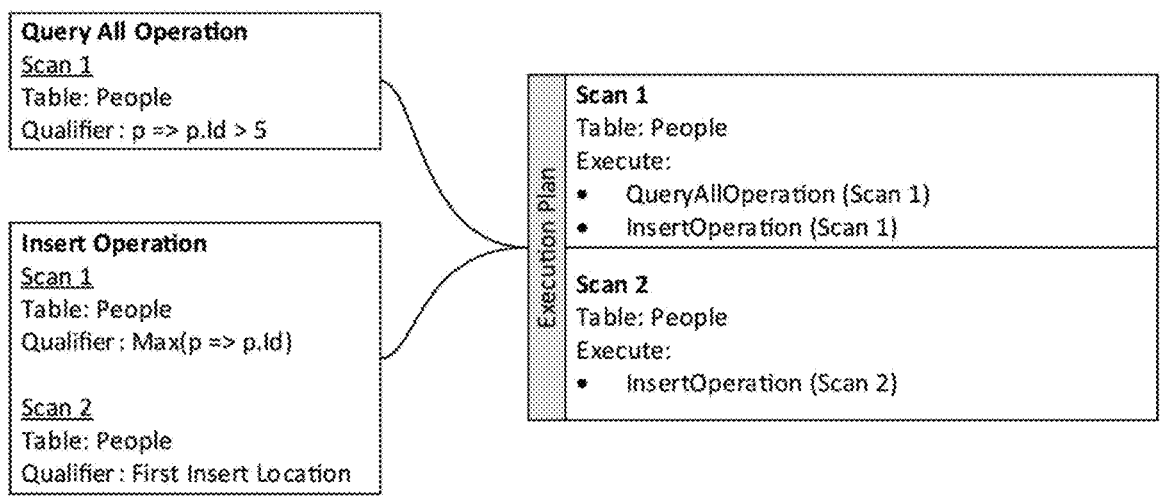
FIG. 12. Example flow chart of build syntax tree execution.

The engine may then combine table scans for all of the IScanningOperation types that are not separated by IExecutableOperation types. In this way, table scans are shared across operations. For instance, referring to FIG. 12, two operations are shown that have their separate table scan lists. The "Query All" operation requires one table scan, identified as 'Scan 1", and targets the 'People' table, with the qualifier p=>p.id>5. Here, rows will be identified that meet the criterion of the lambda expression predicate. The "Insert" operation requires two scans, 'Scan 1' and 'Scan 2'. On Scan 1, the qualifier Max(p=>p.id), the operation finds the row with highest ID number. On Scan 2, the "Insert" operation will go back and identify the first position in the table to insert a new row, based on the result from the first scan, indicating to insert a new row after the row containing the highest ID number. According to the innovation, the operations share Scan 1, the (execution?) engine software will group QueryAllOperation and InsertOperation(Scan1) in Scan 1, and only InsertOperation(Scan 2) in Scan 2, as illustrated in FIG. 12.

The execution engine of the innovative dbQW relies on IScanningOperation type methods to structure generated code blocks that correspond to the submitted query. An example is a block of generated code for the query shown in FIG. 13, for the AllAsync method. The code block that is generated by the execution engine may be structured around a framework that is common to all operations. For example, the exemplary code template generated for AllAsync shown in FIG. 13 may be used for a plurality of methods, or all methods contained within the various operation classes contained within the innovative software. A plurality of table-manipulation operations inherit from IScanningOperation, therefore, when implemented, the execution engine may call upon the methods contained within the IScanningOperation interface when generating the execution code. The operations can be organized into a template code block shown in Table 1.

TABLE I

```
IEnumberabe<OperationResult> Execution(DbAdapter adapter)
{
    List<OperationResult> results = new List<OperationResult>( );
                GenerateOperationLocals,
GenerateOperationInitailizer
        using (DbRowEnumerator rowEnumerator rowEnumerator = new
        DbRowEnumerator(adapter, "People"))
        {                GenerateScanLocals, GenerateScanInitializer
while (rowEnumerator.MoveNext( ) || !operation_0_complete)
        {
            if (operation_0_complete)
                break;
            if (rowEnumertor.CurrentExits)
            {
                            GenerateExistenceScanExpression
            }
            else
```

TABLE I-continued

```
            {
                            GenerateNonExistenceScanExpression
            }
        }
                GenerateScanFinalizer
    }
                GenerateOperationFinalizer
return results;
}
```

In Table I, the bold labels are the method names that are called on the IScanningOperation interface, and are contained therein. These also represent the sections where code from each of the operations is injected. By way of example, the method labeled GenerateOperationLocals is responsible for listing the local variables that are required for the operation code that is generated, and GenerateOperationInitializer is called by operations to initialize the local variables set up by the previous method for the entire execution. In FIG. 13, an assembled generated code listing is displayed, with code snippets inserted by the IScanningOperation methods are displayed below the boxes containing the IScanningOperation method labels, and outlined by dashed-line rectangles.

In FIG. 13, the code is of a generated function 1300 that performs the optimized query. For instance, code snippet 1301 defines a Boolean result "queryResult" for QueryAll, which is a nullable result because if no items have been found, queryResult receives a null value. At code snippet 1302 the table scan is initialized, and code snippet 1303 is the beginning of the scan loop embodied by the while loop. The while loop reads the rows while they exist, until the operations have completed. In code snippet 1303, the engine checks to see if the row exists, by checking the RowExistenceFile. Code snippet 1304 is the row existence expression is executed if the row does indeed exist. The predicate query is the search for rows whose ID number is greater than 5, and the expression uses the GetInt32Unsafe(0) method to capture the ID value of the row, as the engine is able to map the ID column to column index 0. If the expression is true, that is, the value of the row ID is greater than 5, then the Boolean local queryResult is assigned a TRUE value. If the row ID is less than 5, queryResult is FALSE. The next code snippet 1305 checks to see if the entire table or buffered portion of the table has been scanned. If rowEnumerator.IsComplete is true, when all rows within the table have been scanned, then the local Boolean flag operation_0_complete is assigned a TRUE value and the loop is exited. In fact, the loop is exited each time a row matching the query expression is found. At code snippet 1306, the operation adds the row to the results variable if the operation succeeded, which is a List type. Also in code snippet 1206, if the operation failed, the result is added to the results list with the exception flag added. Finally, the function returns the results list.

Figure 14:
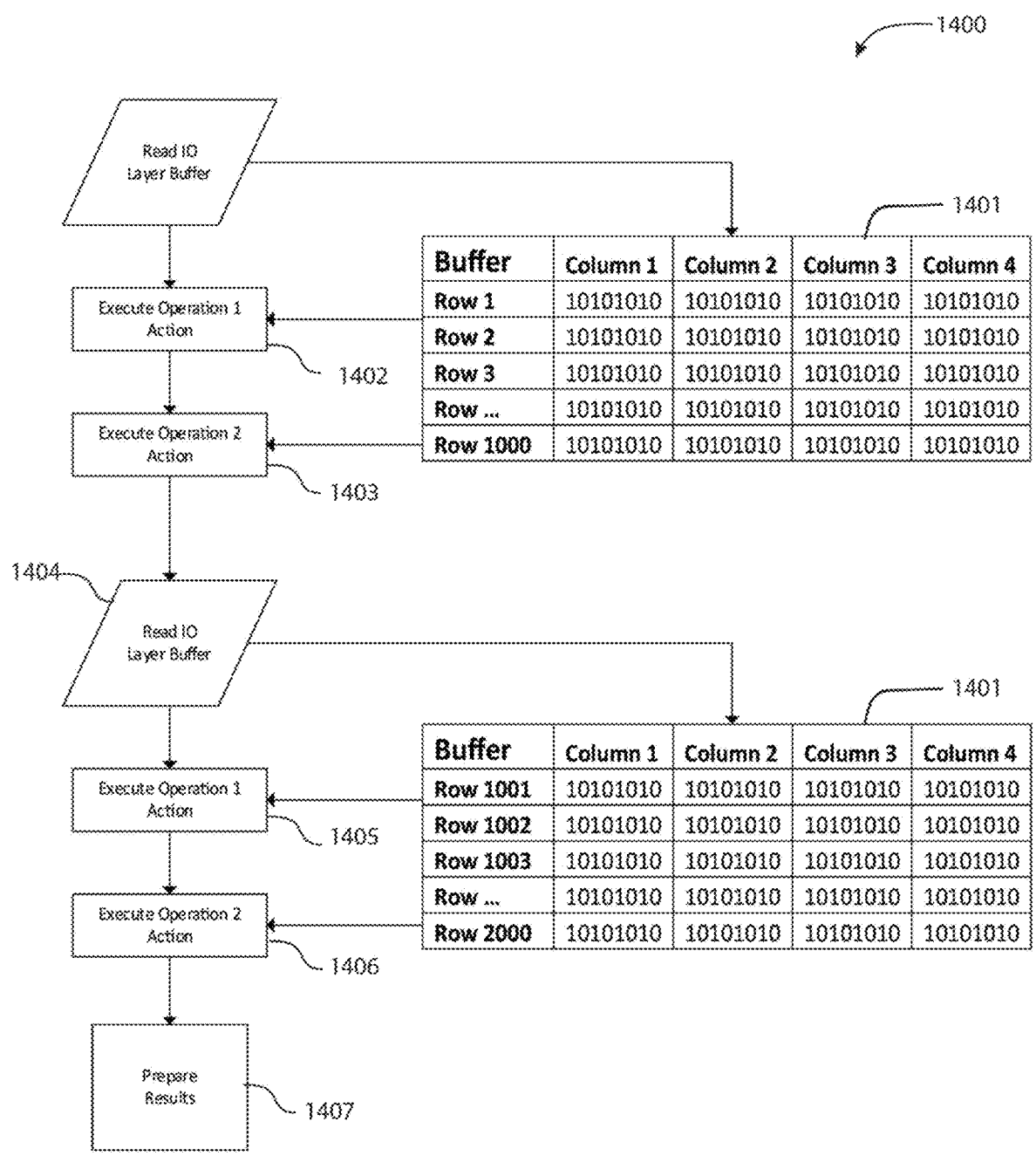
FIG. 14. Exemplary flow chart of a single buffer scan operation

Finally, in FIG. 14, a flow chart 1400 is shown of the method according to the instant innovation of executing each operation in sequence against a single buffer scan, represented by RAM buffer block 1401. The relationship shows that a first portion of a table is loaded into buffer 1301, and a sequence of operations 1402 and 1403 are executed against the rows in this buffer. When each of the operations are executed on all of the rows of the buffer, the rows are transferred to the original table, and a second portion of a table is loaded into buffer 1401 in step 1404. Operations 1405 and 1406 are executed against each of this new set of rows, and continue until the end of the buffer is reached. In this example, operations 1405 and 1406 may be identical to operations 1402 and 1403. Results are then prepared in step 1407.

Figure 15:
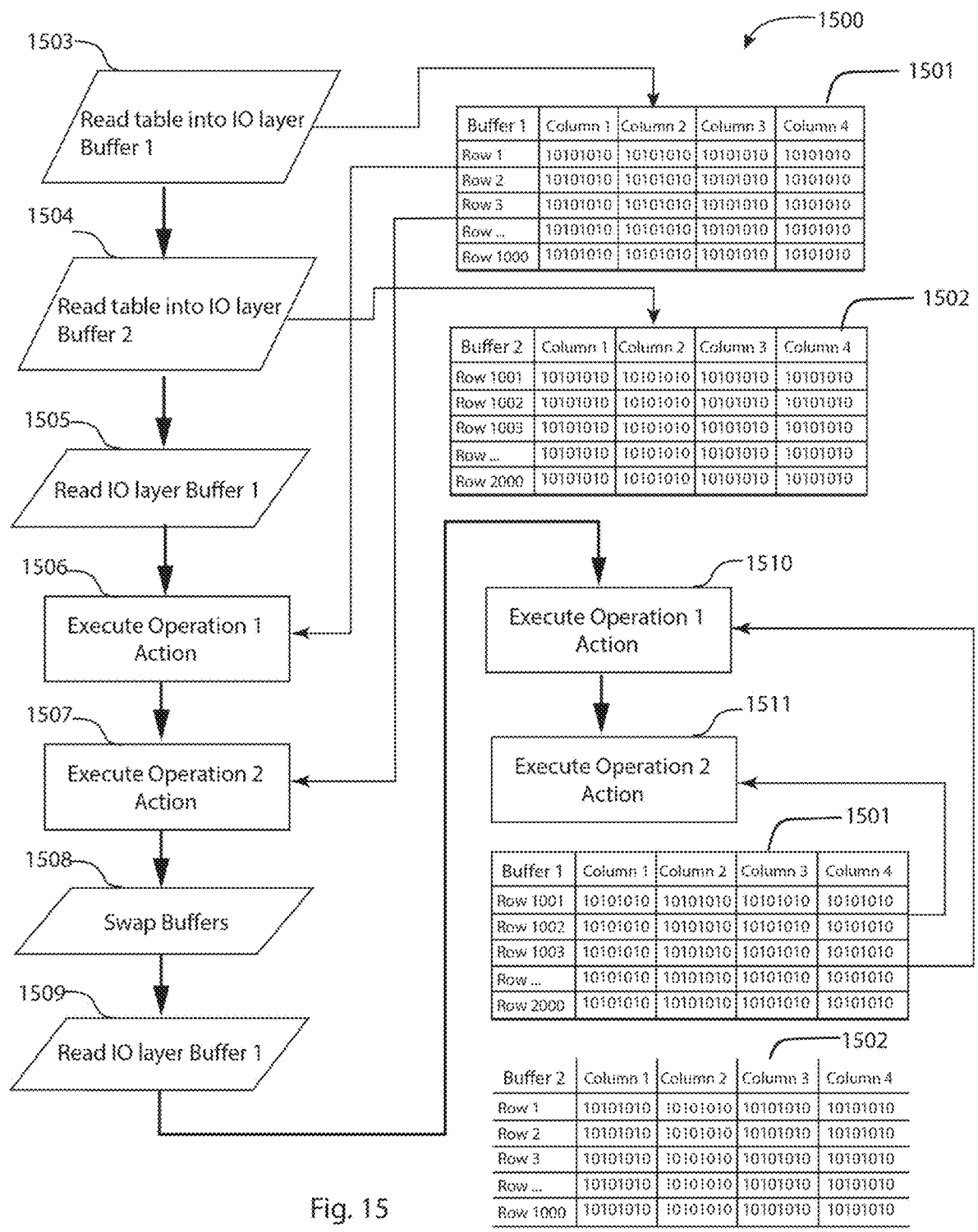
FIG. 15. Exemplary flow chart of a double buffer operation

A double buffer example is shown by flow chart 1500 in FIG. 15. In this example, two buffers 1501 and 1502 are employed, where a first portion of a table is read into the first buffer (Buffer 1, 1501), and a second portion of the table is read into the second buffer (Buffer 2, 1502). The two read operations take place in steps 1503 and 1504, respectively. Once read into buffers 1501 and 1502, the rows are scanned (step 1505) and one or more operations are performed on each row (steps 1506 and 1507). When the end of the buffer is reached, the contents of Buffer 1 (1501) and Buffer 2 (1502) are swapped in step 1508. Buffer 1 is again scanned (step 1509) and operations are again performed row by row (operations 1510 and 1511). As with the single buffer operations, operations in steps 1510 and 1511 may be identical to operations 1506 and 1507.

To understand the novel features of the instant innovation more deeply, a comparison may be made to state of the art self-contained serverless database engines, for example, SQLite. A database engine such as SQLite may typically be written in C #, accepts and executes SQL statements. In this case, SQL statements are run in the C++ runtime, which requires that objects be marshalled between C # and the C++ runtime.

For example, the following SQL statement is submitted as a query:

SELECT*FROM PEOPLE WHERE AGE>50

From the perspective of C #, the above SQL statement may be generated from a C # statement:

people.Where(person=>person.Age>50)

The SQL statement is passed to the SQLite engine where it is parsed, and potentially compiled, and the results returned to the calling logic.

The innovative dbQW engine does not parse SQL. Rather, it works with expression trees that are passed as objects to the execution layer to be turned into operations that run against the particular tables. These expressions can come from lambda expressions that are natively parsed by the C # compiler. By way of example, an expression tree is pass to the innovative dbQW engine and covert it to method calls that the I/O layer supplies. The expression tree may have the following form:

```
List results = people.Where(person => person.Age > 50).ToList( );
where it is converted to the following function by the formatting layer:
List results = new List( );
while (IDataRow row in peopleDataSource.GetRows( ))
{
    if (row.GetInt32Unsafe(2) > 50)
    {
    results.Add(DeserializePersonFromRow(row));
    }
}
return results;
```

For the above example, the innovative dbQW knows that the Age property of the Person object maps to the 3$^{rd}$ column in the table, which has an index position of 2 (starting from index 0). The engine also knows that the Age property is an Int32 type, and so it knows to call the GetInt32Unsafe method, which returns an Int32 type. In this way, the column's index value does not need to be cast to or from a boxed type.

In another example, the entire person object is passed as an argument to another function. The engine cannot see the expression tree for the function being called. This means the entire person object needs to be deserialized and passed into that function. The IsProperAgeFunction is the same predicate as the above lambda examples, but could contain much more advanced logic. The following simplified form:

```
Func<Person, bool> IsProperAgeFunction =
(person) =>
{
    if (person.Age > 50)
    {
        return true;
    }
    return false;
};
List results = people.Where(person =>
IsProperAgeFunction(person)).ToList( );
```

In the innovative engine, this function gets converted to:

```
List results = new List( );
while (IDataRow row in peopleDataSource.GetRows( ))
{
    Person person = DeserializePersonFromRow(row);
    if (IsProperAgeFunction(person))
    {
        results.Add(person);
    }
}
return results;
```

In the above example, advanced C # logic can occur in a function external to the database processing engine, and the engine will operate with that function in the most optimal way it knows how to (deserializng the row to an object and calling the function directly). For a technology like SQLite to use a custom function, the entire object would need to be marshalled from the C++ runtime into the C # runtime, even if it is a row that will be discarded, and this would occur for every database row being queried. The advantage the instant innovation has is that the database isn't some layer that custom functions can't permeate. The C # layer is capable of operating at the lowest layer of the innovative dbQW engine.

The real advantage is that a developer can build an application using our database that has something like filtering or search capabilities. Those capabilities could be highly complexed based on application logic that can be defined in C #, rather than trying to find a way to create that same logic within SQL (which is sometimes impossible to do). This allows custom fuzzy matching algorithms on text, or complex filters based on configurable logic/rules, both really difficult things to translate into SQL statements. Moreover, the functions for doing all of this are called directly from the database engine at the time it decides whether to keep a row or discard it, rather than the engine deciding to keep the row and marshal it from the C++ runtime to the C # runtime before deciding whether or not to keep or discarding it from the final results. For data tables that are greater than hundreds of thousands of rows in size, this is a clear performance improvement.

While the embodiments set forth above describe the innovative database engine for this disclosure, it is understood that these are exemplary, and that other embodiments that have not been described herein may be equivalent variants, and thus do not depart from the scope and spirit of the innovation, as claimed in the claims below.

The invention claimed is:

1. A method for processing a database, comprising:
  i) providing a database query engine for querying a relational database having at least one table and column and row schema for the at least one table, said database query engine comprising database query software stored on at least one storage medium accessible via an API or a SDK; and
  ii) creating a set of files on the at least one storage medium, said set of files representing the relational database, the set of files comprising:
    a) at least one Fixed-Length Values file for storing fixed-length values read from said relational database into the Fixed-Length Values file, the Fixed-Length Values file having a schema that is the same as the schema of the relational database;
    b) at least one Row-Existence file wherein said at least one Row Existence file comprises at least one data byte, each of the at least one data byte having up to 8 row existence flag bits, each flag bit corresponding to one of the rows in the one or more fixed-length values file, the number of data bytes in the row-existence file being at least the sum of the quotient and the modulus of the number of rows in the fixed-length values file divided by 8;
    c) at least one Columns file to store metadata for each column of the Fixed-Length Values file;
    d) creating at least one Variable-Length Values file for storing variable length values read from said relational database, wherein the one or more variable-length values residing in the database are stored in the at least one Variable-Length Values file; and
    e) creating at least one Fragments file for storing pointers to offsets of fragments in the variable length values file, said fragments being gaps existing in the variable length values file created after a pre-existing variable length value is deleted or replaced by a new variable-length value that is shorter than the pre-existing variable length value.

2. The method for processing a database of claim 1, further comprising the step of inserting a fixed-length pointer in the fixed-length values file at address offsets corresponding to each of the one or more columns residing in said database at a row and column position, wherein said fixed-length pointer comprises an address offset and length byte pointing to each of the one or more variable-length values stored in the Variable-Length Values file.

3. The method for processing a database of claim 1, further comprising:
  i) creating a dual buffer in a memory location, said dual buffer comprising a first buffer and a second buffer;
  ii) reading a first block of data from the fixed-length values file into the first buffer for processing by a database processing engine;
  iii) swapping the buffer pointers so that the said second buffer is prepared for reading the second block, and the first buffer is ready to be processed;
  iv) reading a second block of data from the fixed-length values file into the second buffer;
  v) processing the first block of data from the first buffer in parallel with reading a second block of data from the fixed-length values file into the second buffer;
  vi) reading the first block of data to the fixed-length values file from the first buffer after processing by the database processing engine; and
  vii) swapping the buffer pointers so that the said second buffer is prepared for processing the second block of data, and the first buffer is prepared for reading a third block of data from the fixed-length values file.

4. The method for processing a database of claim 1, further comprising the step of passing one or more expression trees directly to the execution engine, wherein said one or more expression trees are converted into methods that are executed against the database.

5. The method for processing a database of claim 4, wherein the step of passing one or more expression trees directly to the execution engine comprises converting the one or more expression trees into at least one method for deleting at least one column, and updating the columns file.

6. The method for processing a database of claim 4, wherein the step of passing one or more expression trees directly to the execution engine comprises converting the one or more expression trees into at least one method for adding or deleting at least one row in the Fixed-Length Values file, wherein the row existence file is updated by changing the Boolean state of the flag bit in the Row Existence file corresponding to the table index of the added row.

7. The method for processing a database of claim 4, wherein the step of passing one or more expression trees directly to the execution engine comprises converting the one or more expression trees into at least one method for updating at least one column in the fixed-length values file, wherein the metadata for the column is updated in the Columns file.

8. The method for processing a database of claim 4, wherein the step of passing one or more expression trees directly to the execution engine comprises converting the one or more expression trees into at least one method for updating at least one row contained in the Fixed-Length Values file by updating at least one fixed-length value, each of the at least one fixed-length values having a row index corresponding to the at least one row.

9. The method for processing a database of claim 4, wherein the step of passing one or more expression trees directly to the execution engine comprises converting the one or more expression trees into at least one method for updating at least one variable-length value contained in the Variable-Length Values file, and accessing and updating the at least one variable-length value pointer contained in the Fragments file.

10. The method for processing a database of claim 4, wherein the step of passing one or more expression trees directly to the execution engine comprises converting the one or more expression trees into at least one method for reading the blocks of data and swapping buffers to allow one buffer to be read in parallel with another buffer being operated against.

11. The method for processing a database of claim 1, further comprising the step of changing Boolean state of a row existence flag bit in the Row Existence file when the corresponding row is deleted from the database or added to the database.

12. The method for processing a database of claim 11, wherein the step of changing the Boolean state of a row existence flag bit in the Row Existence file comprises setting said row existence flag bit from logical zero to logical one when the corresponding row is reclaimed by a newly inserted row.

13. The method for processing a database of claim 11, wherein the step of changing the Boolean state of a row existence flag bit in the Row Existence file comprises clearing said row existence flag bit from logical one to logical zero when the corresponding row is reclaimed by a newly inserted row.

14. The method for processing a database of claim 11, wherein the step of changing the Boolean state of a row existence flag it in the Row Existence file comprises clearing said row existence flag bit from a logical one to a logical zero when the corresponding row is deleted.

15. The method for processing a database of claim 11, wherein the step of changing the Boolean state of a row existence flag it in the Row Existence file comprises setting said row existence flag bit from a logical zero to a logical one when the corresponding row is deleted.

16. The method for processing a database of claim 1, wherein the step of creating one or more fixed-length values files comprises creating one or more fixed-length values files having row headers comprising metadata containing the number of nullable columns contained within each row of the fixed-length values file.

17. The method for processing a database of claim 15, wherein the metadata created in the step of creating one or more fixed-length values files having row headers comprising metadata containing the number of nullable columns contained within each row of the fixed-length values file comprise one or more data bytes, each of the one or more data bytes storing up to eight nullable column identification bits, the value of each of said nullable column identification bits corresponds to a nullable column value in the row.

18. The method for processing a database of claim 15, wherein the step of creating one or more fixed-length values files having row headers comprising metadata containing the number of nullable columns contained within each row of the fixed-length values file further comprises setting each nullable column identification bit when the corresponding column within the row contains a value, and clearing said nullable column identification bit when the corresponding column within the row contains is null.

19. The method for processing a database of claim 1, wherein the step of querying a set of rows from a table is performed by compiling a set of expressions that perform deserialization of data from either the first buffer or the second buffer.

20. The method for processing a database of claim 10, wherein the step of compiling a set of expressions based on how the data is being queried, interleaved with expressions based on how the data is stored in the files and the combination of these two sets of expressions making up the expression set that gets compiled and executed against the buffers.

21. The method for processing a database of claim 1, wherein the database and the database query engine software are stored on the same mass storage device.

22. The method for processing a database of claim 21, wherein the mass storage device is carried on a mobile computing device.

* * * * *